(12) United States Patent
Sakata et al.

(10) Patent No.: US 9,398,139 B2
(45) Date of Patent: *Jul. 19, 2016

(54) SHORT-RANGE WIRELESS COMMUNICATION APPARATUS

(71) Applicant: DENSO CORPORATION, Kariya, Aichi-pref. (JP)

(72) Inventors: Ryuuji Sakata, Kariya (JP); Mariko Yamanaka, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,069

(22) Filed: Jun. 19, 2015

(65) Prior Publication Data

US 2015/0288794 A1    Oct. 8, 2015

Related U.S. Application Data

(62) Division of application No. 14/128,885, filed as application No. PCT/JP2012/003688 on Jun. 6, 2012, now Pat. No. 9,094,092.

(30) Foreign Application Priority Data

Jun. 30, 2011  (JP) ................................. 2011-145781
May 21, 2012  (JP) ................................. 2012-115621

(51) Int. Cl.
| H04M 1/725 | (2006.01) |
| H04W 4/00 | (2009.01) |
| H04B 7/26 | (2006.01) |
| H04M 1/60 | (2006.01) |

(52) U.S. Cl.
CPC ............ *H04M 1/7253* (2013.01); *H04B 7/26* (2013.01); *H04M 1/6091* (2013.01); *H04W 4/008* (2013.01); *H04M 1/6075* (2013.01); *H04M 2250/02* (2013.01)

(58) Field of Classification Search
CPC ..................................................... H04W 4/008
USPC ................. 455/3.01, 3.06, 41.2, 569.1, 569.2
See application file for complete search history.

(56) References Cited

U.S. PATENT DOCUMENTS

| 8,019,272 B2 * | 9/2011 | Masuda ................. H04H 20/61 455/3.01 |
| 2004/0063459 A1 * | 4/2004 | Yamashita ............. H04H 20/88 455/556.1 |
| 2008/0269961 A1 | 10/2008 | Shitanaka et al. |

FOREIGN PATENT DOCUMENTS

| JP | 2007-047260 A | 2/2007 |
| JP | 2008-530905 A | 8/2008 |
| JP | 2008-273370 A | 11/2008 |

OTHER PUBLICATIONS

Office Action dated Jul. 20, 2015 in corresponding CN application No. 201280031924.7 with translation.
International Search Report (English and Japanese) and Written Opinion of the ISA (with partial English translation) for PCT/JP2012/03688, ISA/JP, mailed Jul. 31, 2012.
U.S. Appl. No. 14/128,885, filed Dec. 23, 2013, Sakata et al.

* cited by examiner

*Primary Examiner* — Tuan H Nguyen
(74) *Attorney, Agent, or Firm* — Harness, Dickey & Pierce, P.L.C.

(57) ABSTRACT

An onboard apparatus uses two modes to transfer audio data from a mobile phone. A first mode transfers and outputs audio data stored in the mobile phone. The first mode communicates control data according to a control data transfer protocol and transfers and outputs audio data according to an audio data transfer protocol. The second mode permits the mobile phone to successively buffer audio data stored in a server on a communication network and to concurrently transfer and output the buffered data. The second mode replaces the control data transfer protocol with a specific data communication protocol. The second mode communicates control data according to the specific data communication protocol and transfers and outputs audio data according to the audio data transfer protocol. The second mode can communicate any commands and data using the specific data communication protocol regardless of commands specified in the control data transfer protocol.

17 Claims, 11 Drawing Sheets

SHORT-RANGE WIRELESS COMMUNICATION APPARATUS

CROSS REFERENCE TO RELATED APPLICATION

This application is a divisional application of U.S. patent application Ser. No. 14/128,885 filed on Dec. 23, 2013 which is a 371 national phase of PCT/JP2012/003688, filed on Jun. 6, 2012, which is based on Japanese Patent Application No. 2011-145781 filed on Jun. 30, 2011 and Japanese Patent Application No. 2012-115621 filed on May 21, 2012, the disclosures of which are incorporated herein by reference.

TECHNICAL FIELD

The present disclosure relates to a short-range wireless communication apparatus having a connection portion capable of connecting an audio data transfer protocol specifying audio data transfer, a control data transfer protocol specifying transfer of control data related to audio data control, and a specific data communication protocol specifying data communication with a communication partner apparatus using a short-range wireless link.

BACKGROUND ART

The short-range wireless communication apparatus includes a short-range wireless communication function and connects a short-range wireless link with a communication partner apparatus such as a mobile phone. The short-range wireless communication apparatus connects the audio data transfer protocol and the control data transfer protocol with the communication partner apparatus. The audio data transfer protocol specifies transfer of audio data such as music data. The control data transfer protocol specifies transfer of control data concerning audio data control. The short-range wireless communication apparatus communicates control data (e.g. tune names and various commands such as a replay command, a pause command, and a stop command) with the communication partner apparatus according to the control data transfer protocol. The short-range wireless communication apparatus permits the communication partner apparatus to transfer audio data according to the audio data transfer protocol. As disclosed in Patent Literature 1, for example, the Bluetooth (registered trademark) communication standards specify A2DP (Advanced Audio Distribution Profile) as an audio data transfer protocol to regulate audio data transfer and AVRCP (Audio/Video Remote Control Profile) as a control data transfer protocol to regulate transfer of control data concerning the audio data control.

PRIOR ART LITERATURES

Patent Literature

[Patent Literature 1] JP 2008-273370 A

SUMMARY OF INVENTION

The short-range wireless communication apparatus permits the communication partner apparatus to transfer and output audio data in two available modes. A first mode permits the communication partner apparatus to transfer and output audio data stored in a nonvolatile storage portion of the communication partner apparatus. The second mode permits the communication partner apparatus to successively buffer audio data stored in a communication network server and transfer and output the buffered data from the communication partner apparatus (e.g., audio data streaming from so-called Internet radio).

As described above, the first mode connects A2DP as the audio data transfer protocol and AVRCP as the control data transfer protocol and communicates control data with the communication partner apparatus according to AVRCP. This enables the communication partner apparatus to reliably transfer and output audio data stored in the communication partner apparatus. However, the second mode cannot satisfactorily provide functions (services) for the communication partner apparatus to transfer and output audio data stored in a communication network server even if A2DP is connected as the audio data transfer protocol and AVRCP is connected as the control data transfer protocol.

The present disclosure has been made in consideration of the foregoing. It is, therefore, an object of the present disclosure to provide a short-range wireless communication apparatus capable of appropriately enabling not only a function to permit a communication partner apparatus to transfer and output audio data stored in the communication partner apparatus, but also a function to permit the communication partner apparatus to transfer and output audio data stored in a communication network server.

According to an aspect of the present disclosure, a short-range wireless communication apparatus is provided as follows. A connection portion is capable of connecting an audio data transfer protocol, a control data transfer protocol, and a specific data communication protocol to a communication partner apparatus via a short-range wireless link, wherein the audio data transfer protocol specifies transfer of audio data, the control data transfer protocol specifies transfer of control data concerning audio data control, and the specific data communication protocol specifies data communication. A control portion is to select either a first mode or a second mode, wherein the first mode permits the communication partner apparatus to transfer first audio data stored in a nonvolatile storage portion of the communication partner apparatus and the second mode permits the communication partner apparatus to transfer second audio data stored in a nonvolatile storage portion of a server on a communication network. An audio data output portion is to output audio data transferred from the communication partner apparatus according to the audio data transfer protocol.

Herein, when determining that the first mode is selected, in a state where the control portion keeps the control data transfer protocol and the audio data transfer protocol connected to the communication partner apparatus, the control portion communicates first control data concerning control of the first audio data with the communication partner apparatus according to the control data transfer protocol, and permits the communication partner apparatus to transfer the first audio data according to the audio data transfer protocol. In contrast, when determining that the second mode is selected, in a state where the control portion keeps the audio data transfer protocol and the specific data communication protocol connected to the communication partner apparatus, the control portion communicates second control data concerning control of the second audio data with the communication partner apparatus according to the specific data communication protocol, and permits the communication partner apparatus to transfer the second audio data according to the audio data transfer protocol.

There may be a case of unsatisfactorily providing the function to permit the communication partner apparatus to transfer and output second audio data stored in the communication network server. In such a case, the control data transfer protocol may be replaced by the specific data communication protocol. Instead of a control data communication protocol, the specific data communication protocol is used to communicate second control data with the communication partner apparatus. This enables the communication partner apparatus to transfer and output the second audio data stored in the communication network server. As a result, it is possible to appropriately provide not only a function to permit the communication partner apparatus to transfer and output audio data stored in the communication partner apparatus, but also a function to permit the communication partner apparatus to transfer and output audio data stored in the communication network server. The communication signifies at least one of data transmission and data reception.

BRIEF DESCRIPTION OF DRAWINGS

The above and other objects, features and advantages of the present disclosure will become more apparent from the following detailed description made with reference to the accompanying drawings. In the drawings:

BRIEF DESCRIPTION OF DRAWINGS

Figure 1:
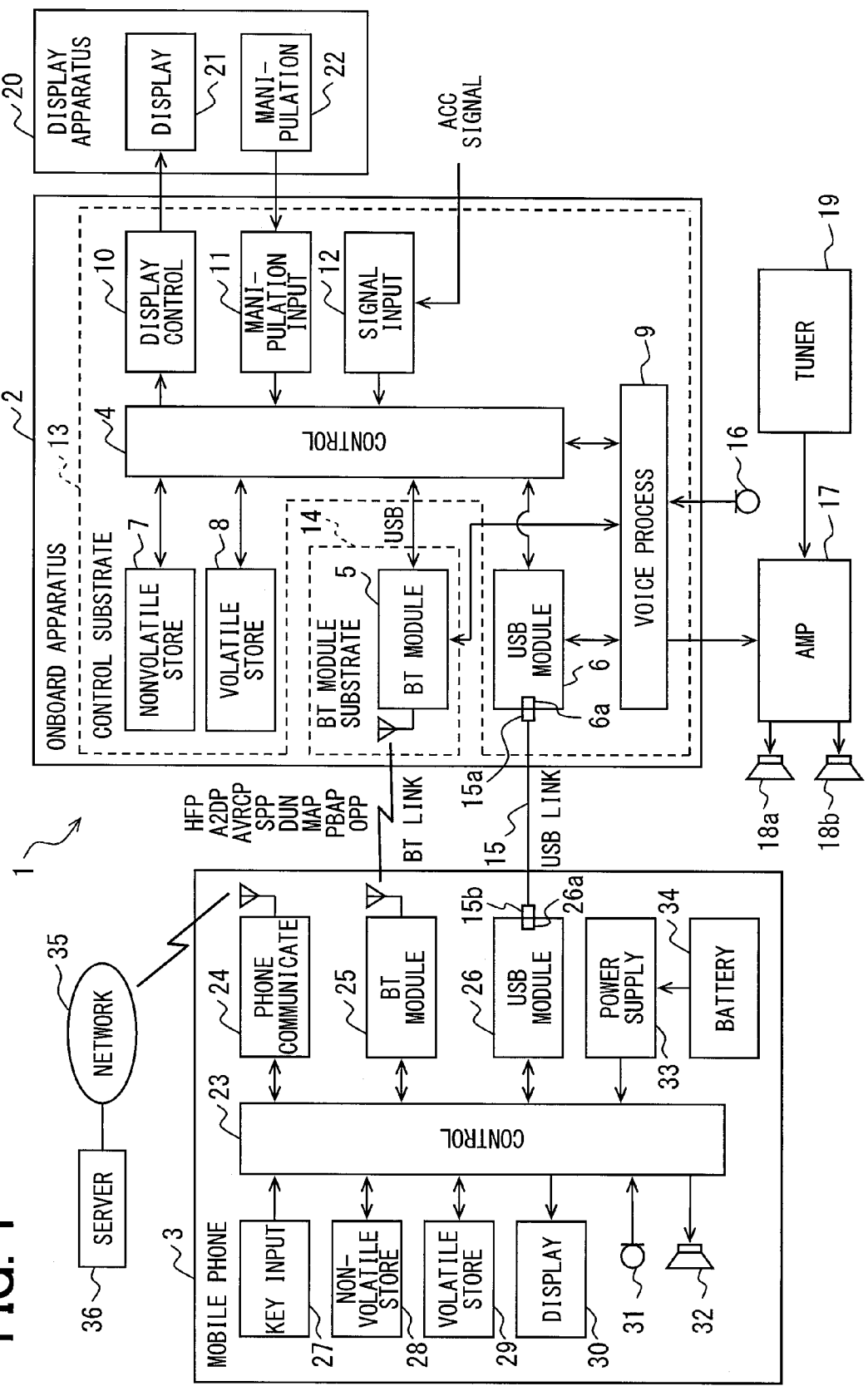
Figure 2:
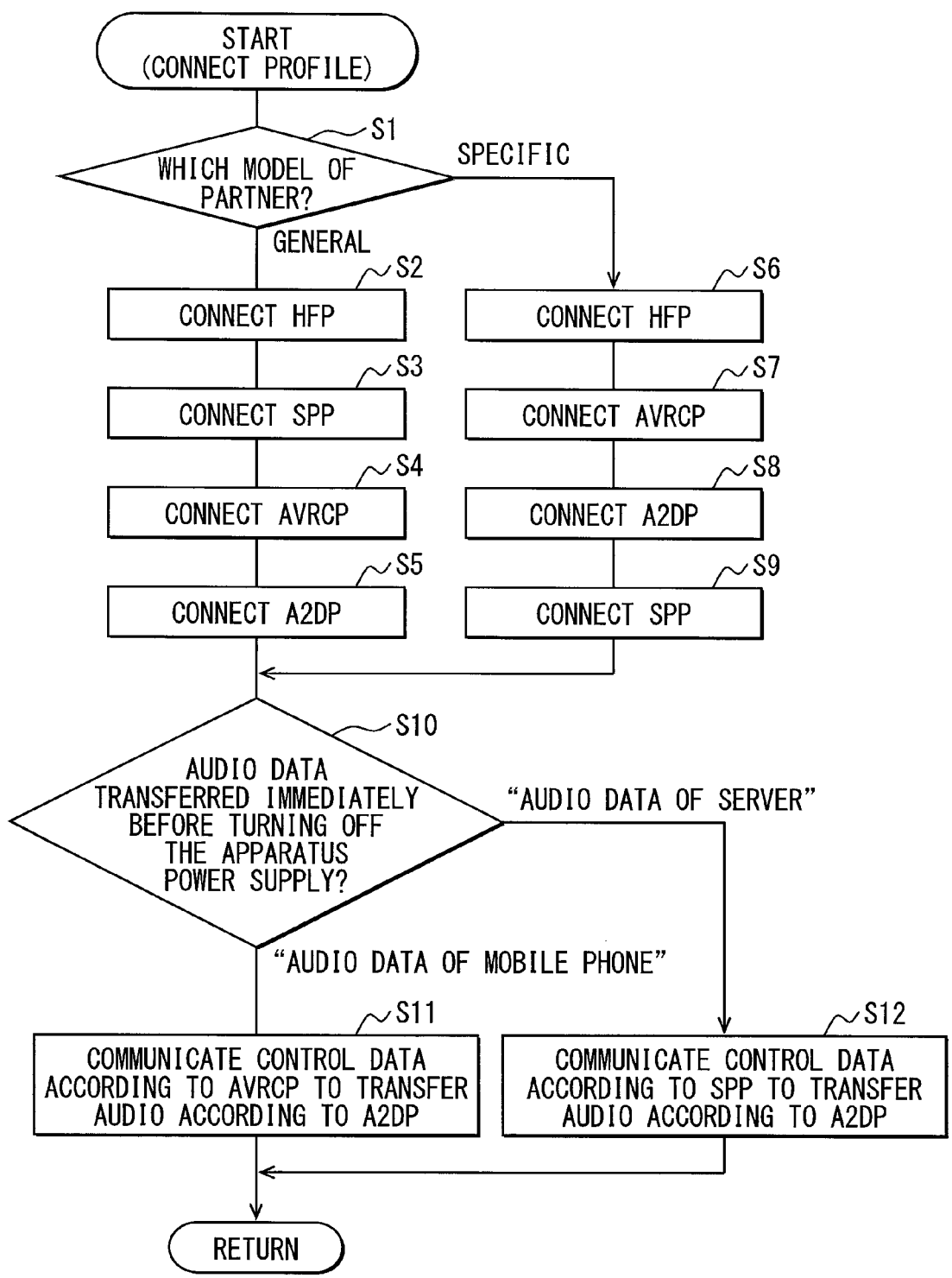
Figure 3:
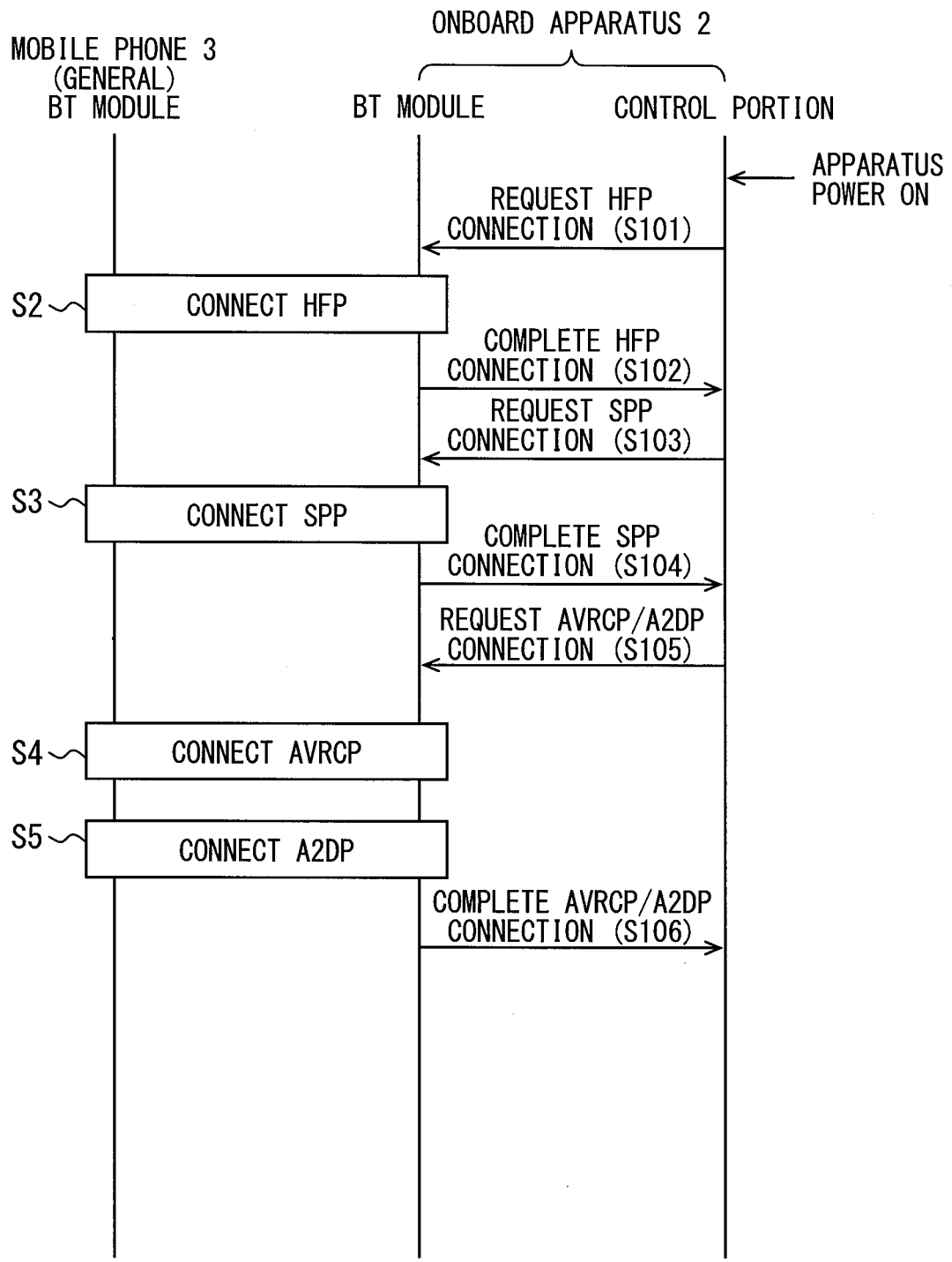
Figure 4:
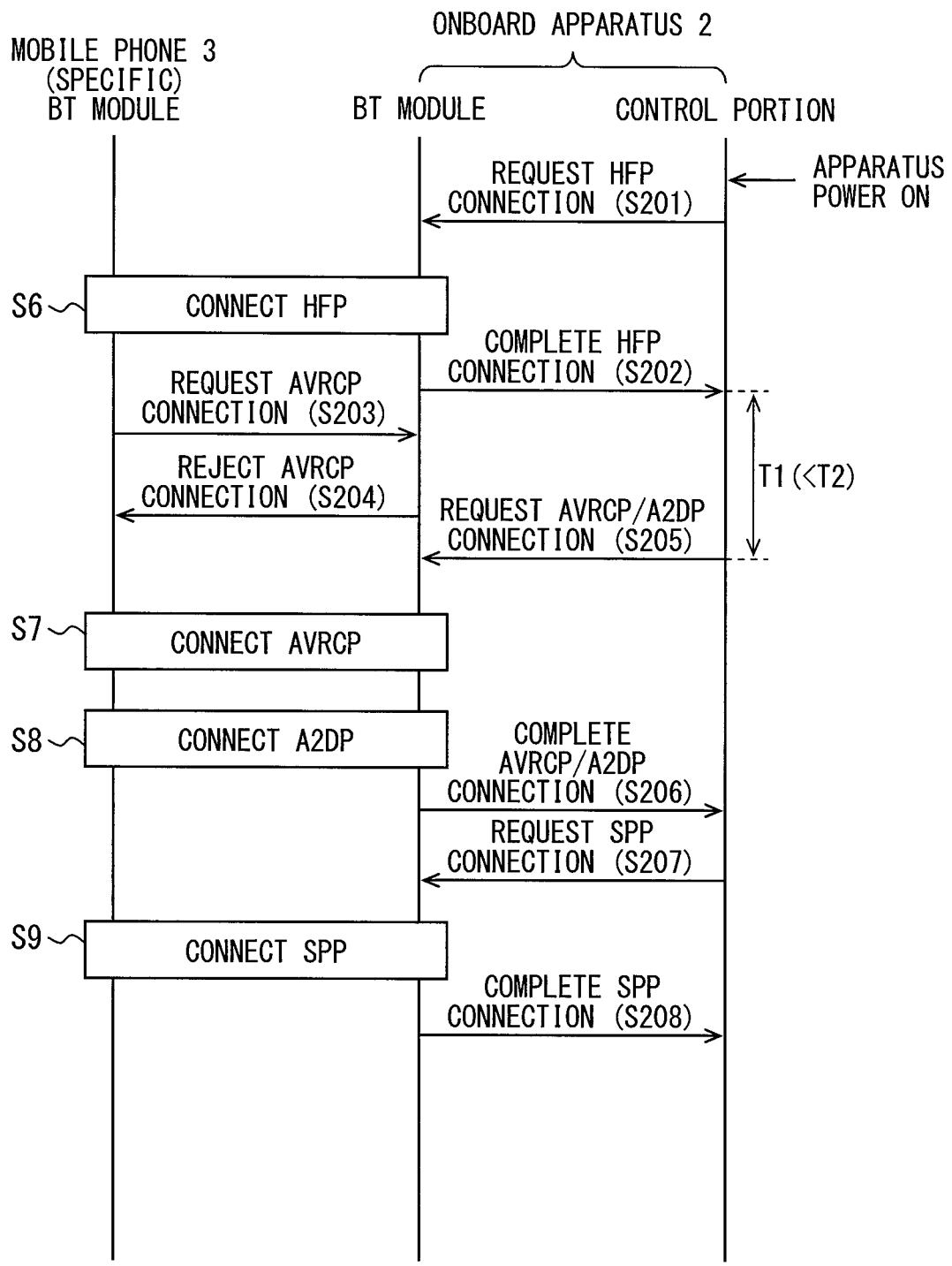
Figure 5:
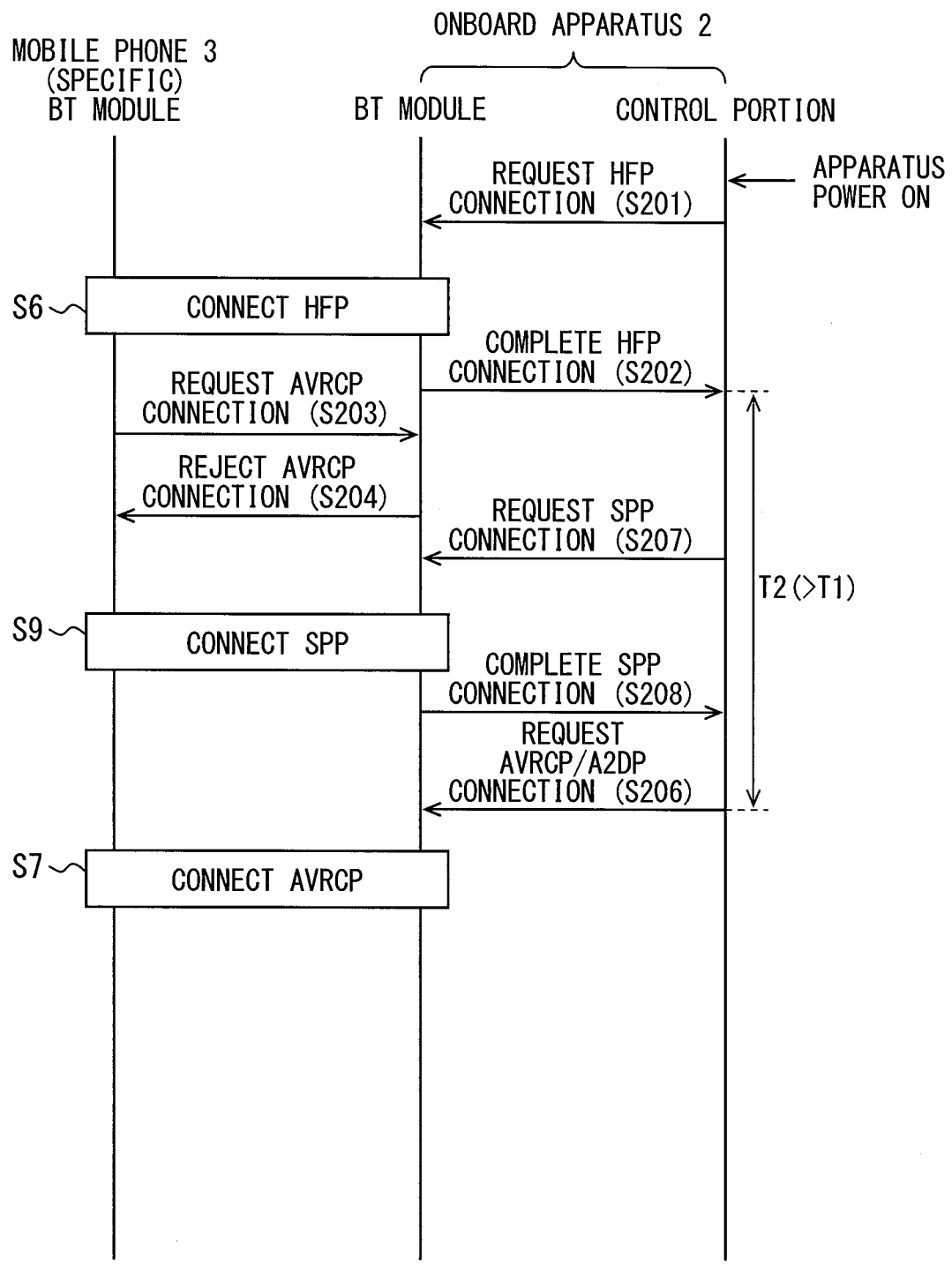
Figure 6:
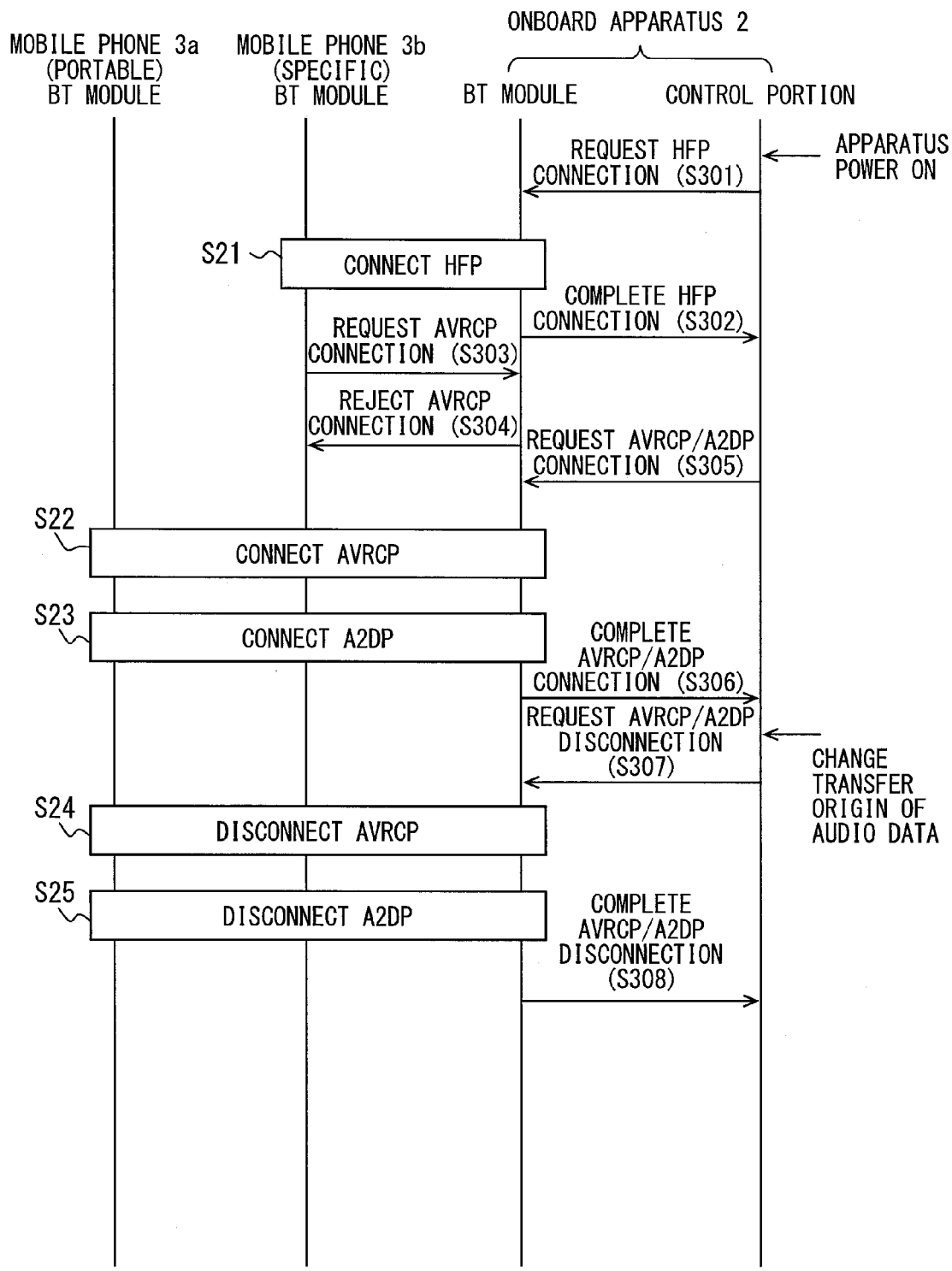
Figure 7:
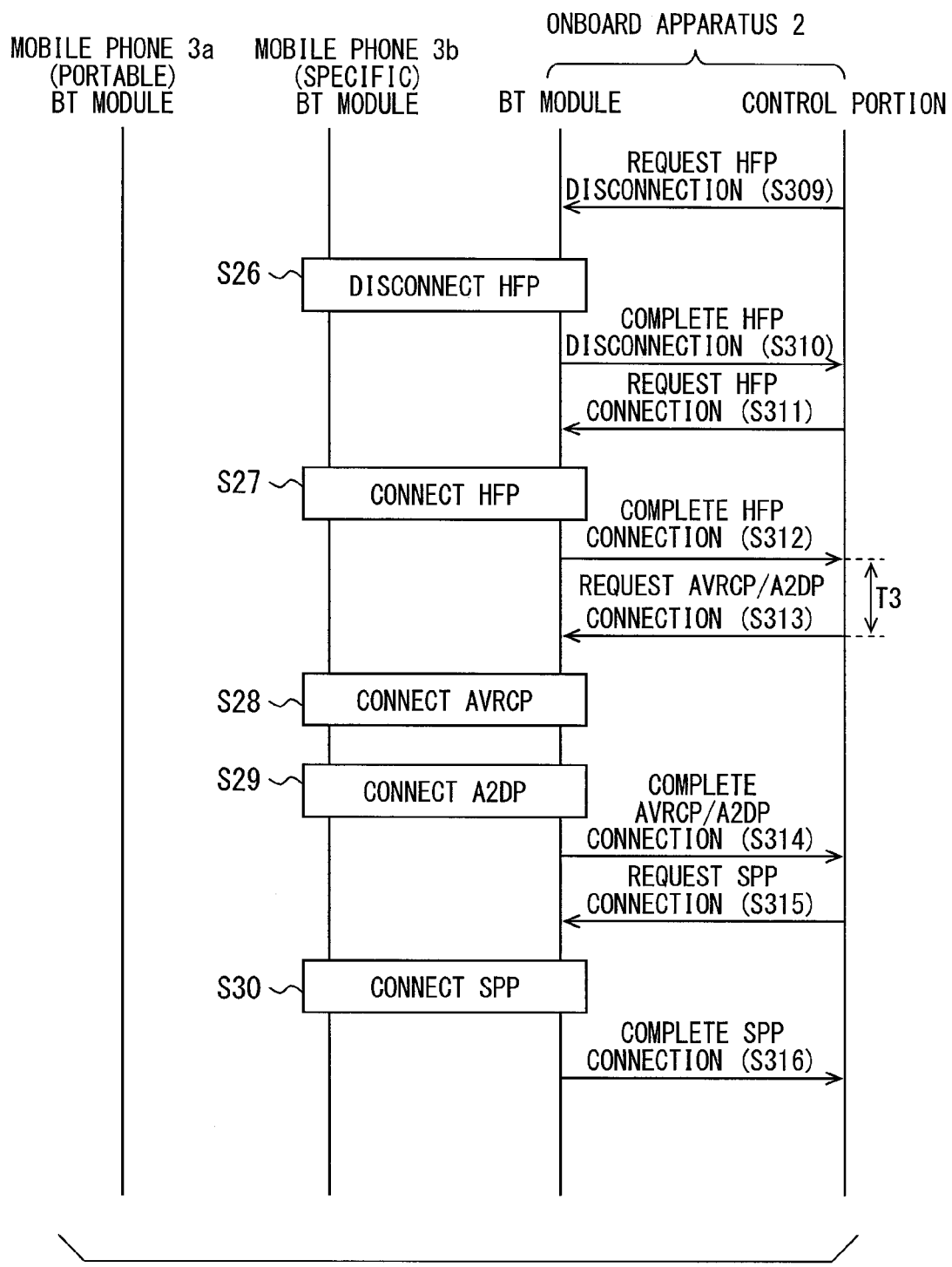
Figure 8:
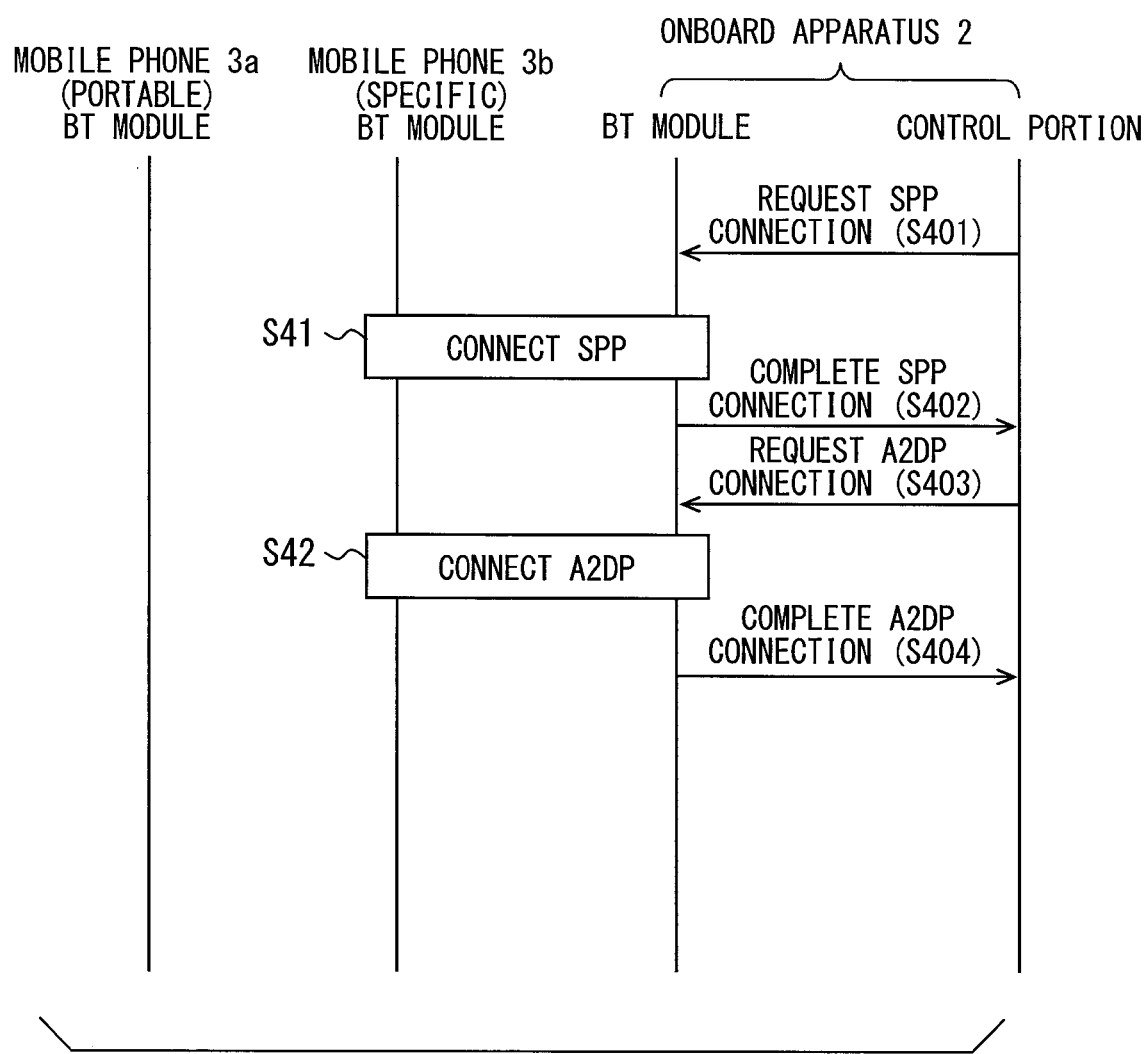
Figure 9:
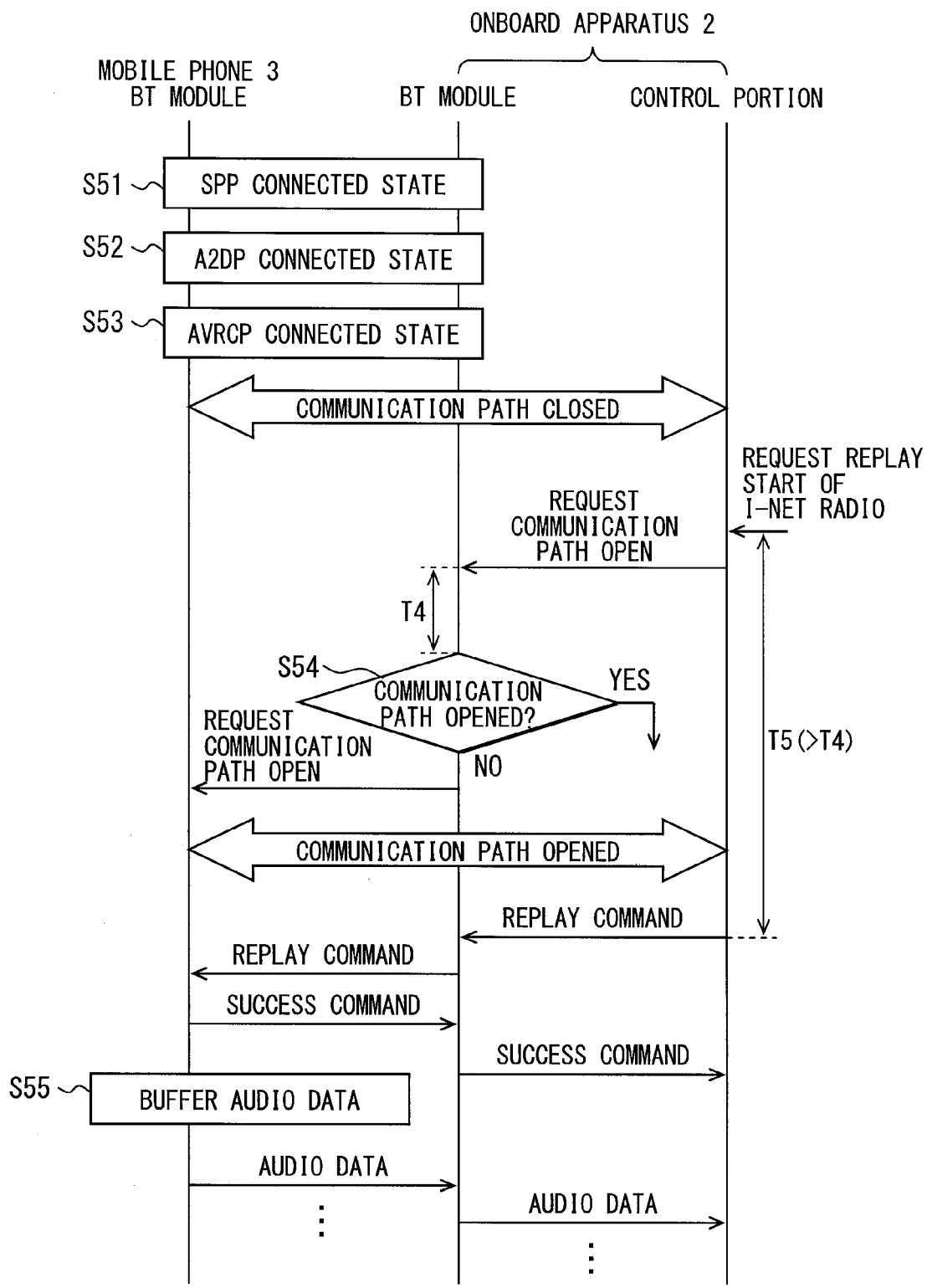
Figure 10:
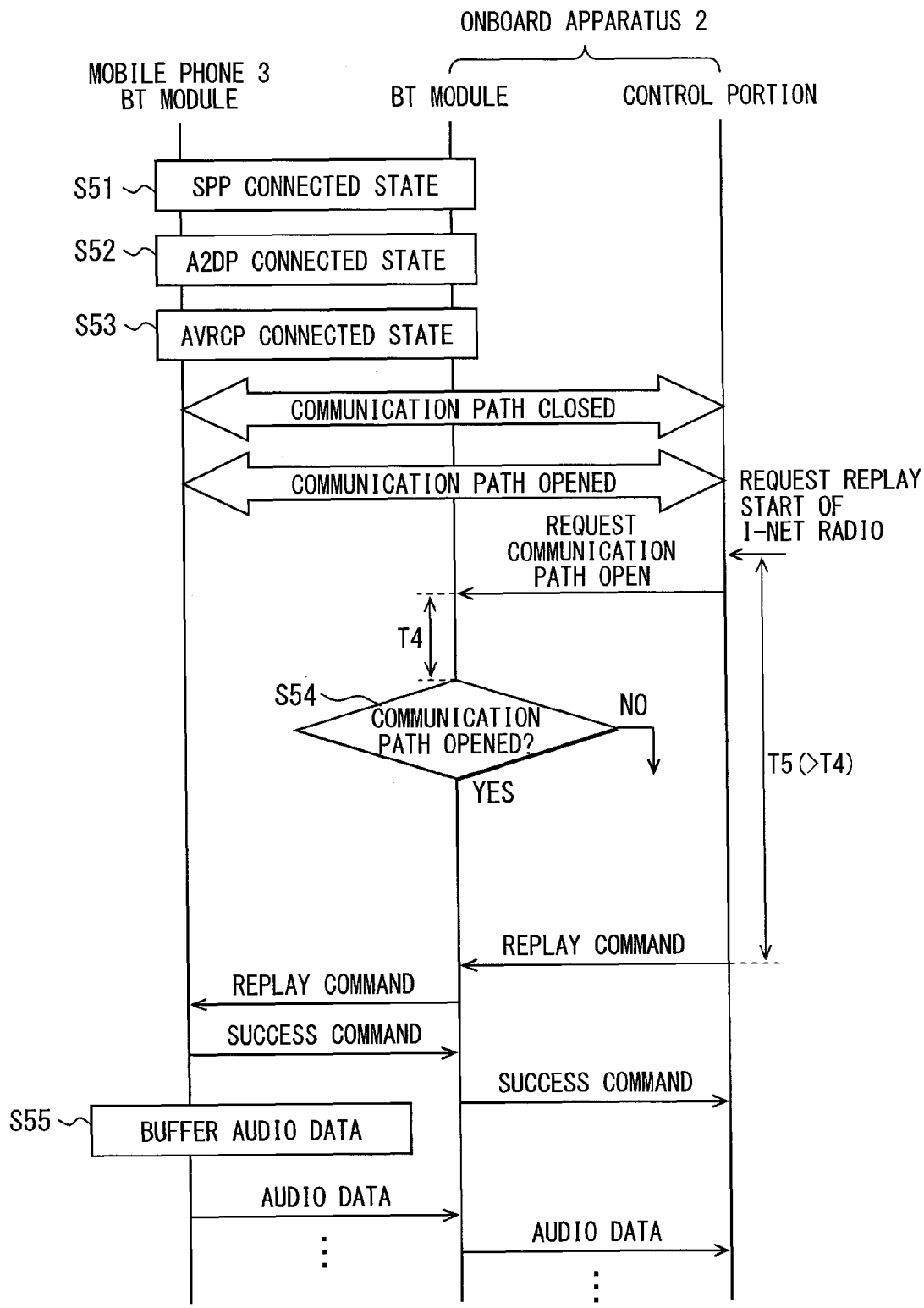
Figure 11:
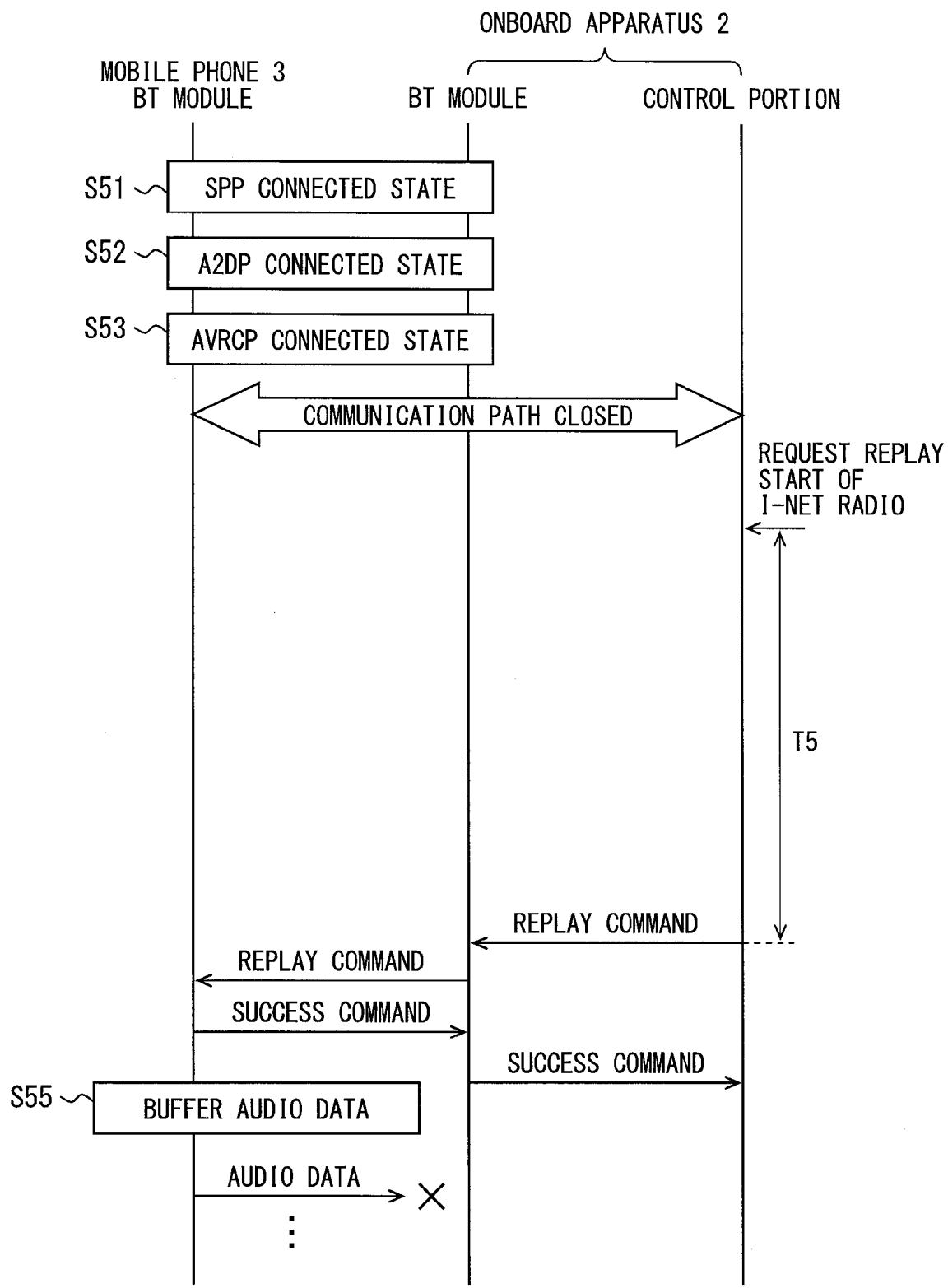

FIG. 1 is a functional block diagram illustrating an embodiment of the present disclosure;
FIG. 2 is a flowchart illustrating a process performed by an onboard apparatus;
FIG. 3 is a sequence diagram;
FIG. 4 is a sequence diagram;
FIG. 5 is a sequence diagram;
FIG. 6 is a sequence diagram;
FIG. 7 is a sequence diagram;
FIG. 8 is a sequence diagram;
FIG. 9 is a sequence diagram;
FIG. 10 is a sequence diagram; and
FIG. 11 is a sequence diagram.

EMBODIMENT FOR CARRYING OUT INVENTION

With reference to the accompanying drawings, the following describes an embodiment that applies the present disclosure to a Bluetooth-compliant onboard apparatus (hereinafter referred to simply as an onboard apparatus) having the Bluetooth communication function. Bluetooth is a registered trademark and is hereinafter abbreviated to BT. The following describes a case where a BT-compatible mobile phone (hereinafter referred to simply as a mobile phone) having the BT communication function is brought into a vehicle compartment of a vehicle mounted with the onboard apparatus and BT communication is available between the onboard apparatus and the mobile phone. The communication signifies data transmission and/or data reception.

A BT communication system 1 includes an onboard apparatus 2 (referred to as a short-range wireless communication apparatus) mounted on a vehicle and a mobile phone 3 (also referred to as a communication partner apparatus) brought into a vehicle compartment. The onboard apparatus 2 includes a control portion 4 (also referred to as a control device or a control means), a BT module 5 (also referred to as a connection portion, a connection device, or a connection means), a USB (Universal Serial Bus) module 6, nonvolatile storage portion 7 (also referred to as a storage device or a storage means), a volatile storage portion 8, a voice processing portion 9, a display control portion 10, a manipulation input portion 11, and a signal input portion 12. The control portion 4, the USB module 6, the nonvolatile storage portion 7, the voice processing portion 9, the display control portion 10, the manipulation input portion 11, and the signal input portion 12 are physically mounted on a control substrate 13. The BT module 5 is physically mounted on a BT module substrate 14 that is a member different from the control substrate 13. The control portion 4 and the BT module 5 are connected through a USB.

The control portion 4 includes a known microcomputer that contains a CPU, RAM, ROM, and an I/O bus. The control portion 4 controls overall operations such as communication operations of the onboard apparatus 2 and data management operations. The BT module 5 connects a BT link (also referred to as a short-range wireless link) to a BT module of the mobile phone 3 (to be described) and performs BT communication through the BT link. The BT module 5 is capable of simultaneously connect (so-called multi-connection) multiple profiles such as HFP (Hands Free Profile), A2DP (Advanced Audio Distribution Profile), AVRCP (Audio/Video Remote Control Profile), SPP (Serial Port Profile), DUN (Dial-up Networking Profile), MAP (Message Access Profile), PBAP (Phone Book Access Profile), and OPP (Object Push Profile) compliant to the BT communication standards. HFP is also referred to as a handsfree communication protocol and specifies the handsfree communication. A2DP is also referred to as an audio data transfer protocol and specifies audio data transfer. AVRCP is also referred to as a control data transfer protocol and specifies transfer of control data concerning audio data control. SPP is also referred to as a specific data communication protocol and specifies data communication assumed to be a virtual serial port. DUN specifies dial-up connection to the Internet. MAP specifies transfer of e-mail data. PBAP specifies transfer of phone book data. OPP also specifies transfer of phone book data. HFP, A2DP, AVRCP, SPP, DUN, MAP, PBAP, and OPP signify data communication protocols defined for the respective functions.

The USB module 6 includes a connection terminal 6a that can be connected to or disconnected from a connection terminal 15a of a USB connection cable 15. The connection terminal 15a of the USB connection cable 15 is connected to the connection terminal 6a. A connection terminal 15b of the USB connection cable 15 is connected to a connection terminal of a USB module in the mobile phone 3 (to be described). The USB module 6 connects a USB link as a communication link to the USB module of the mobile phone 3 and provides USB communication using the USB link.

The nonvolatile storage portion 7 includes a storage portion area capable of storing various data. When the BT module 5 connects MAP to the BT module of the mobile phone 3, the nonvolatile storage portion 7 stores e-mail data transferred from the mobile phone 3 to the BT module 5. The e-mail data includes sender information, reception time and date information, type information, and subject information. The sender information can identify an e-mail sender. The reception time and date information can identify the time and date when e-mail was received on the mobile phone 3. The type information can identify an e-mail type. The subject information can identify an e-mail subject entered by the sender, for example. When the BT module 5 connects PBAP to the BT module of the mobile phone 3, the nonvolatile storage portion 7 stores phone book data, call origination history data, and call termination history data. The phone book data is transferred from the mobile phone 3 to the BT module 5. The call origination history data shows the correspondence between call originating times and call originating phone numbers concerning call origination operations from the onboard apparatus 2 or the mobile phone 3 connecting HFP with the onboard apparatus 2. The call termination history data shows the correspondence between call terminating times and call terminating phone numbers concerning call termination operations on the mobile phone 3 connecting HFP with the onboard apparatus 2. Immediately before the apparatus power turns off, the nonvolatile storage portion 7 stores information (also referred to as pre-power-off mode) indicating audio data transferred from the mobile phone 3. The volatile storage portion 8 includes a storage portion area capable of storing, while buffering, audio data streamed from the mobile phone 3.

The voice processing portion 9 connects with a microphone 16 that is provided in a vehicle compartment and is placed near a steering wheel, for example, or at a position easily collecting the voice uttered from a user. The voice processing portion 9 also connects with an audio amplifier 17 provided outside the onboard apparatus 2. The audio amplifier 17 connects with speakers 18a and 18b (also referred to as an audio data output portion, an audio data output device, or an audio data output means).

Suppose that the BT module 5 connects HFP to the BT module of the mobile phone 3 (to be described). In such a case, the voice processing portion 9 is supplied with the voice uttered from the user as transmission voice data from the microphone 16 and processes the supplied transmission voice data and outputs it to the BT module 5. The voice processing portion 9 is supplied with reception voice data from the BT module 5 and outputs the supplied reception voice data to the audio amplifier 17.

Suppose that the BT module 5 connects A2DP and AVRCP to the BT module of the mobile phone 3 (to be described). In such a case, audio data is transferred to the BT module 5 from the BT module of the mobile phone 3 according to the A2DP and AVRCP. The voice processing portion 9 outputs the audio data to the audio amplifier 17. Suppose that the USB communication is available between the USB module 6 and a USB module of the mobile phone 3 (to be described). In such a case, Audio data is transferred to the USB module 6 from the USB module of the mobile phone 3 according to the USB link. The voice processing portion 9 outputs the audio data to the audio amplifier 17.

The audio amplifier 17 is supplied with reception voice data or audio data from the voice processing portion 9, amplifies the supplied reception voice data or audio data, and permits the speakers 18a and 18b to output the amplified reception voice data or audio data. The audio amplifier 17 also connects with a tuner deck 19. For example, the tuner deck 19 reproduces music data from a music recording medium and supplies the music data to the audio amplifier 17. The audio amplifier 17 amplifies the supplied music data and permits the speakers 18a and 18b to output the amplified music data.

A display apparatus 20 includes a display unit 21 and a manipulation unit 22 on the screen. The display unit 21 displays various display screens (also referred to as windows). The manipulation unit 22 provides a touch switch on the display screen. When supplied with a display instruction signal from the control portion 4, the display control portion 10 controls display operations of the display unit 21 in the display apparatus 20 based on the supplied display instruction signal. When a user manipulates a touch switch formed on the display screen, the manipulation input portion 11 is then supplied with a manipulation detection signal from the manipulation unit 22. The manipulation input portion 11 outputs the supplied manipulation detection signal to the control portion 4. The control portion 4 analyzes the manipulation detection signal supplied from the manipulation input portion 11 to identify the user manipulation.

The signal input portion 12 is connected to an accessory (ACC) switch mounted on the vehicle. When supplied with an ACC signal output from the ACC switch, the signal input portion 12 outputs the supplied ACC signal to the control portion 4. The control portion 4 turns on or off the apparatus based on the ACC signal supplied from the signal input portion 12. That is, the control portion 4 turns on the apparatus (to start the onboard apparatus 2) when the ACC signal changes from off to on. The control portion 4 turns off the apparatus (to stop the onboard apparatus 2) when the ACC signal changes from on to off. To turn off the apparatus, the control portion 4 permits the nonvolatile storage portion 7 to store the type of audio data transferred from the mobile phone 3 immediately before the apparatus is turned off.

The mobile phone 3 includes a control portion 23, a phone communication portion 24, a BT module 25, a USB module 26, a key input portion 27, a nonvolatile storage portion 28 (also referred to as a nonvolatile storage portion of the communication partner apparatus), a volatile storage portion 29, a display portion 30, a microphone 31, a speaker 32, and a power supply portion 33.

The control portion 43 includes a known microcomputer that contains a CPU, RAM, ROM, and an I/O bus. The control portion 43 controls overall operations such as communication operations of the mobile phone 3 and data management operations. The phone communication portion 24 provides phone communication with a communication network 35. The communication network 35 includes a mobile phone base station, a base station control portion, and other facilities that provide known mobile phone communication services. The BT module 25 connects a BT link to the BT module 5 of the above-mentioned onboard apparatus 2 and performs BT communication through the BT link. The BT module 25 is capable of simultaneously connecting multiple profiles compliant to the BT communication standards such as HFP, A2DP, AVRCP, SPP, DUN, MAP, PBAP, and OPP.

The USB module 26 includes a connection terminal 26a that can be connected to or disconnected from a connection terminal 15b of the USB connection cable 15. The connection terminal 15a of the USB connection cable 15 is connected to the connection terminal 6a of the USB module 6 of the onboard apparatus 2. The connection terminal 15b of the USB connection cable 15 is connected to the connection terminal 26a. The USB module 26 connects a USB link to the USB module 6 in the onboard apparatus 2 and provides USB communication using the USB link.

The key input portion 27 includes various keys manipulated by a user. The key input portion 27 outputs a manipulation detection signal to the control portion 43 in response to a key manipulated by the user. The control portion 43 analyzes the manipulation detection signal supplied from the key input portion 27 to identify the user manipulation.

The nonvolatile storage portion 28 includes a storage portion area capable of storing various data such as audio data. The volatile storage portion 29 includes a storage portion area capable of storing, while buffering, audio data streamed from a server 36 on the communication network 35. When supplied with a display instruction signal from the control portion 43, the display portion 30 displays various display screens based on the supplied display instruction signal. The control portion 43 is supplied with the voice uttered from the user as transmission voice data from the microphone 31 and processes the supplied transmission voice data. The control portion 43 is supplied with reception voice data from the phone communication portion 24 and outputs the supplied reception voice data as the voice from the speaker 32. The power supply portion 33 supplies the functional blocks with the power as the operating power discharged from a battery 34 that can be attached to or detached from the apparatus body.

According to the above-mentioned configuration, the control portion 4 in the onboard apparatus 2 outputs audio data transferred from the mobile phone 3 in two modes as follows. One mode is also referred to as first mode for BT audio. In this mode, the onboard apparatus 2 permits the BT module 25 to transfer audio data such as music data (also referred to as first audio data) stored in the nonvolatile storage portion 28 of the mobile phone 3 to the BT module 5 and outputs the audio data from the speakers 18a and 18b of the onboard apparatus 2. The other mode is also referred to as second mode. In this mode, the onboard apparatus 2 permits the volatile storage portion 29 of the mobile phone 3 to successively buffer audio data (also referred to as second audio data) stored in the nonvolatile storage portion of the server 36 on the communication network 35. At the same time, the onboard apparatus 2 permits the BT module 25 to transfer the buffered audio data to the BT module 5. The onboard apparatus 2 permits the volatile storage portion 8 to successively buffer the audio data in the volatile storage portion 8 and concurrently outputs the buffered audio data from the speakers 18a and 18b. An example of the second mode is to output audio data for the Internet radio (to distribute the contents of an audio program according to Internet protocols).

In the first mode, the onboard apparatus 2 permits the BT module 25 to transfer audio data stored in the mobile phone 3. The onboard apparatus 2 can transfer the audio data using A2DP and use AVRCP to communicate AVRCP-compliant control commands (such as replay command, pause command, and stop command). The user can manage various controls concerning audio data. In the second mode, however, the onboard apparatus 2 permits the volatile storage portion 29 of the mobile phone 3 to successively buffer audio data stored in the server 36 on the communication network 35 and concurrently permits the BT module 25 to transfer the buffered audio data. The onboard apparatus 2 cannot sufficiently communicate AVRCP-compliant control commands using AVRCP. The user cannot manage various controls concerning audio data.

The mobile phone 3 works as a communication partner of the onboard apparatus 2 and is capable of two types of behavior to transmit AVRCP (and A2DP) connection requests as described below. The inventors found that the mobile phone 3 can be broadly classified into the types according to specifications and that the type can be identified as a general model or a specific model. These findings are based on results of connection tests on diverse types of the mobile phone 3.

(a) general model that does not transmit an AVRCP connection request to the onboard apparatus 2 after completion of an HFP connection process (b) specific model that transmits an AVRCP connection request to the onboard apparatus 2 after completion of an HFP connection process When completing an HFP connection process, the onboard apparatus 2 receives an AVRCP connection request from the specific-type mobile phone 3 as a communication partner. At this time, the onboard apparatus 2 disallows any connection request from the communication partner. The onboard apparatus 2 rejects the AVRCP connection request if received from the specific-type mobile phone 3. The onboard apparatus 2 transmits AVRCP connection rejection to the specific-type mobile phone 3. Suppose that the onboard apparatus 2 transmits AVRCP connection rejection to the specific-type mobile phone 3. In this case, the mobile phone 3 does not transmit the A2DP connection request to the onboard apparatus 2 even if the onboard apparatus 2 transmits a new AVRCP connection request to the specific-type mobile phone 3 to complete the AVRCP connection process after that. In addition, the mobile phone 3 does not transmit the A2DP connection request to the onboard apparatus 2 even if the onboard apparatus 2 instructs output of audio data (Internet radio or BT audio) after that. As a result, the speakers 18a and 18b of the onboard apparatus 2 does not output audio data, but the speaker 32 of the mobile phone 3 outputs audio data instead.

After researching the cause of the defect, we found that the mobile phone 3 does not transmit an A2DP connection request even after completion of the AVRCP connection process if the time exceeds a specified period (e.g., three seconds) between completion of the HFP connection process and transmission of an AVRCP connection request. This may be supposed to be caused by the onboard apparatus 2 having rejected an AVRCP connection request from the mobile phone 3 more than once within a specified time period after completion of the HFP connection process. As a result of testing connections with some specific models, we observed the above-mentioned phenomenon when the onboard apparatus 2 transmits an AVRCP connection request approximately three seconds or longer later than completion of the HFP connection process.

On the other hand, the onboard apparatus 2 receives no AVRCP connection request from the general-type mobile phone 3 as a communication partner when the HFP connection process is completed. The onboard apparatus 2 transmits an AVRCP connection request to the mobile phone 3. When the AVRCP connection process is complete, the mobile phone 3 transmits an A2DP connection request to the onboard apparatus 2. The onboard apparatus 2 permits the A2DP connection request to complete the A2DP connection process. No A2DP connection request may be transmitted when the AVRCP connection process is complete. In such a case, the mobile phone 3 transmits an A2DP connection request to the onboard apparatus 2 when the onboard apparatus 2 instructs audio data output. The onboard apparatus 2 permits the A2DP connection request to complete the A2DP connection process. The audio data is transferred according to A2DP and is output from the speakers 18a and 18b of the onboard apparatus 2. Therefore, audio data is transferred according to A2DP regardless of a time period between completion of the HFP connection process and transmission of an AVRCP connection request.

With reference to FIGS. 2 through 11, the following describes operations of the above-mentioned configuration. FIG. 2 is a flowchart illustrating a process performed by the control portion 4 of the onboard apparatus 2. FIGS. 3 through 11 are sequence diagrams illustrating processes of the onboard apparatus 2 and the communication partner apparatus.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

Furthermore, the software section may be included in a software program, which may be contained in a non-transitory computer-readable storage media as a program product.

In the onboard apparatus 2, the control portion 4 performs the main process while an apparatus power supply of the onboard apparatus 2 turns on (i.e., the ACC switch turns on). The control portion 4 performs a profile connection process as a sub-process in the main process immediately after the apparatus power supply turns on.

The control portion 4 transitions from the main process to the profile connection process. When the profile connection process starts, the control portion 4 determines, based on identification information about the mobile phone 3, whether the mobile phone 3 as a communication partner corresponds to the general model or the specific model (S1). For example, the identification information (e.g., an identification code capable of specifying the manufacturer or the model) is notified from the BT module 25 when the BT link is connected. Specifically, the control portion 4 permits the nonvolatile storage portion 7 to previously store the identification information about the mobile phone 3 corresponding to the specific model based on connection tests on the mobile phone 3. The control portion 4 compares the identification information notified from the mobile phone 3 as a communication partner with the identification information stored in the nonvolatile storage portion 7. In this manner, the control portion 4 determines whether the mobile phone 3 as a communication partner corresponds to the general model or the specific model.

The control portion 4 may determine that the mobile phone 3 as a communication partner corresponds to the general model. In this case, as illustrated in FIG. 3, the control portion 4 outputs an HFP connection request to the BT module 5 (S101). The control portion 4 performs the HFP connection process that connects HFP between the BT module 5 and the BT module 25 (S2).

The control portion 4 is notified of HFP connection completion from the BT module 5 (S102) to determine that the HFP connection process is complete. The control portion 4 outputs an SPP connection request to the BT module 5 (S103). The control portion 4 performs an SPP connection process that connects SPP between the BT module 5 and the BT module 25 (S3). In this case, the general-model mobile phone 3 as a communication partner does not transmit an AVRCP connection request to the onboard apparatus 2 after completing the HFP connection process.

The control portion 4 is notified of SPP connection completion from the BT module 5 (S104) and determines that the SPP connection process is complete. The control portion 4 outputs an AVRCP and A2DP connection request to the BT module 5 (S105). The control portion 4 performs an AVRCP connection process to connect AVRCP between the BT module 5 and the BT module 25 (S4). The control portion 4 performs an A2DP connection process to connect A2DP between the BT module 5 and the BT module 25 (S5). In this case, the AVRCP connection process permits the BT module 5 of the onboard apparatus 2 to start the A2DP connection process when the BT module 5 transmits an AVRCP connection request signal to the BT module 25. The A2DP connection process permits the BT module 25 of the mobile phone 3 to start the A2DP connection process when the BT module 25 transmits an A2DP connection request signal to the BT module 5.

The control portion 4 is notified of AVRCP and A2DP connection completion from the BT module 5 (S106) and determines that the AVRCP connection process and the A2DP connection process are complete. The control portion 4 reads types of audio data stored in the nonvolatile storage portion 7 and determines the type of audio data (e.g., BT audio, Internet radio, FM radio, or AM radio) transferred from the mobile phone 3 immediately before the apparatus power supply turns off (S10).

After performing the above-mentioned process, the control portion 4 may determine that the mobile phone as a communication partner corresponds to the general model. In this case, as illustrated in FIG. 3, the control portion 4 then connects the profiles in the order of HFP, SPP, AVRCP, and A2DP.

The control portion 4 may determine that the mobile phone 3 as a communication partner corresponds to the specific model. In this case, as illustrated in FIG. 4, the control portion 4 outputs an HFP connection request to the BT module 5 (S201) to perform the HFP connection process that connects HFP between the BT module 5 and the BT module 25 (S6).

The control portion 4 is notified of HFP connection completion from the BT module 5 (S202) to determine that the HFP connection process is complete. The control portion 4 then outputs an AVRCP and A2DP connection request to the BT module 5 (S205) unlike the case of determining that the mobile phone 3 as a communication partner corresponds to the general model. The control portion 4 performs the AVRCP connection process to connect AVRCP between the BT module 5 and the BT module 25 (S7). The control portion 4 performs the A2DP connection process to connect A2DP between the BT module 5 and the BT module 25 (S8).

Unlike the general-model mobile phone 3, the specific-model mobile phone as a communication partner transmits an AVRCPP connection request to the onboard apparatus 2 after completion of the HFP connection process (S203). The control portion 4 may determine that the BT module 5 receives an AVRCP connection request from the BT module 25. In such a case, the control portion 4 rejects (disallows) the AVRCP connection request from the specific model mobile phone 3 as a communication partner and permits the BT module 5 to transmit AVRCP connection rejection to the BT module 25 (S204). The control portion 4 also permits the BT module 5 to retransmit AVRCP connection rejection to the BT module 25 if determining that the BT module 5 re-receives an AVRCP connection request from the BT module 25.

The control portion 4 is notified of AVRCP and A2DP connection completion from the BT module 5 (S206) to determine that the AVRCP connection process and the A2DP connection process are complete. The control portion 4 outputs an SPP connection request to the BT module 5 (S207) to perform the SPP connection process that connects SPP between the BT module 5 and the BT module 25 (S9).

The control portion 4 is notified of SPP connection completion from the BT module 5 to determine that the SPP connection process is complete. The control portion 4 reads the audio data type stored in the nonvolatile storage portion 7 to determine the type of audio data transferred from the mobile phone 3 immediately before turning off the apparatus power supply (S10).

The control portion 4 performs the above-mentioned process to determine that the mobile phone 3 as a communication partner corresponds to the specific model. The control portion 4 connects the profiles in the order of HFP, AVRCP, A2DP, and SPP as illustrated in FIG. 4.

That is, the control portion 4 connects the profiles in different orders depending on whether the mobile phone 3 as a communication partner corresponds to the general model or the specific model. When determining that the mobile phone 3 as a communication partner corresponds to the general model, the control portion 4 connects HFP, then SPP, AVRCP, and A2DP. When determining that the mobile phone 3 as a communication partner corresponds to the specific model, the control portion 4 connects HFP, then AVRCP, A2DP, and SPP.

Suppose that the mobile phone 3 as a communication partner corresponds to the specific model. As illustrated in FIG. 4 according to the present embodiment, the control portion 4 connects HFP, then AVRCP and A2DP. As illustrated in FIG. 5, the control portion 4 connects HFP, then SPP, AVRCP, and A2DP similarly to the case where the mobile phone 3 as a communication partner corresponds to the general model. The former (see T1 in FIG. 4) causes a relatively short time period after completion of the HFP connection process until transmission of an AVRCP connection request. The latter (see T2 in FIG. 5) causes a relatively long time period after completion of the HFP connection process until transmission of an AVRCP connection request. That is, the control portion 4 connects HFP and then AVRCP if determining that the mobile phone 3 as a communication partner corresponds to the specific model. This shortens a time period after completion of the HFP connection process until the time to start the AVRCP connection process.

The control portion 4 may determine that audio data read from the nonvolatile storage portion 7 corresponds to the BT audio type. That is, the control portion 4 may determine that audio data was stored in the mobile phone 3 immediately before the most recent turn-off of the apparatus power supply and was transferred and output from the speakers 18*a* and 18*b*. In such a case, the control portion 4 invalidates control data according to SPP. The control portion 4 permits the BT module 5 to transmit an audio data output request command to the BT module 25 according to AVRCP. The audio data output request command issues a request to start outputting audio data. The control portion 4 communicates control data between the BT module 5 and the BT module 25 according to AVRCP. The control portion 4 permits the BT module 25 to transfer the audio data to the BT module 5 according to A2DP and permits the speakers 18*a* and 18*b* to output the audio data (S11). Invalidating control data according to SPP aims to invalidate control data transfer in the software (e.g., not transmitting data or ignoring (or not recognizing) data if received) while enabling the SPP connection, but not to disconnect SPP connected between the BT module 5 and the BT module 25.

The control portion 4 may determine that audio data read from the nonvolatile storage portion 7 corresponds to the Internet radio type. That is, the control portion 4 may determine that audio data was stored in the server 36 on the communication network 35 immediately before the most recent turn-off of the apparatus power supply and was output from the speakers 18*a* and 18*b*. In such a case, the control portion 4 invalidates control data according to AVRCP. The control portion 4 permits the BT module 5 to transmit an audio data output request command to the BT module 25 according to SPP. The audio data output request command issues a request to start outputting audio data. The control portion 4 communicates control data between the BT module 5 and the BT module 25 according to SPP. The control portion 4 permits the BT module 25 to transfer the audio data to the BT module 5 according to A2DP and permits the speakers 18*a* and 18*b* to output the audio data (S12). Invalidating control data according to AVRCP aims to invalidate control data transfer in the software (e.g., not transmitting data or ignoring (or not recognizing) data if received) while enabling the AVRCP connection, but not to disconnect AVRCP connected between the BT module 5 and the BT module 25.

Audio data stored in the mobile phone 3 may be transferred and output. In this case, the control portion 4 communicates control data between the BT module 5 and the BT module 25 according to AVRCP. The control portion 4 permits the BT module 25 to transfer audio data to the BT module 5 according to A2DP and output the audio data from the speakers 18*a* and 18*b*. On the other hand, audio data may be stored in the server 36 on the communication network 35 and may be transferred while being successively buffered in the mobile phone 3. In this case, the control portion 4 uses SPP instead of AVRCP and communicates control data between the BT module 5 and the BT module 25 according to SPP. The control portion 4 permits the BT module 25 to transfer audio data to the BT module 5 according to A2DP and output the audio data from the speakers 18*a* and 18*b*.

Any commands or data (payload) cannot communicate with the mobile phone 3 if control data is communicated according to AVRCP in the same manner as transferring audio data for BT audio while audio data for Internet radio is transferred. Using SPP instead of AVRCP as a profile to communicate control data enables to communicate any commands or data with the mobile phone 3. As a result, it is possible to provide versatile features such as manipulations of selecting or editing programs at broadcast stations or acquiring image data concerning music pieces.

According to the above-mentioned configuration, the control portion 4 connects the profiles in different sequences depending on whether the mobile phone 3 as a communication partner corresponds to the general model or the specific model. However, the control portion 4 may not need to determine whether the mobile phone 3 as a communication partner corresponds to the general model or specific model. As illustrated in FIG. 4, the control portion 4 may connect HFP, then AVRCP and A2DP, and SPP in this order. This enables to transfer audio data according to A2DP on the new mobile phone 3 that may comply with the specific model in the future.

The control portion 4 may not need to determine whether the mobile phone 3 as a communication partner corresponds to the general model or specific model. As illustrated in FIG. 3, the control portion 4 may connect SPP, and then AVRCP and A2DP in this order. If SPP is connected first, the control portion 4 can promptly notify the user of an inadvertent user manipulation that requires communication with various servers on the communication network 35. That is, this can save the time needed for the SPP connection process.

The control portion 4 connects HFP and SPP, and then determines the type of audio data transferred from the mobile phone 3 immediately before turning off the apparatus power supply (S10). The control portion 4 may connect A2DP if determining the Internet radio to be the type of audio data transferred from the mobile phone 3 immediately before turning off the apparatus power supply. The control portion 4 may connect AVRCP and A2DP if determining the BT audio to be the type of audio data transferred from the mobile phone 3 immediately before turning off the apparatus power supply. In this case, the control portion 4 need not invalidate control data according to AVRCP for the Internet radio that does not require connection to AVRCP.

The control portion 4 connects HFP, and then determines the type of audio data transferred from the mobile phone 3 immediately before turning off the apparatus power supply (S10). The control portion 4 may connect SPP and A2DP if determining the Internet radio to be the type of audio data transferred from the mobile phone 3 immediately before turning off the apparatus power supply. The control portion 4 may connect AVRCP and A2DP if determining the BT audio to be the type of audio data transferred from the mobile phone 3 immediately before turning off the apparatus power supply. In this case, the control portion 4 need not invalidate control data according to AVRCP for the Internet radio that does not require connection to AVRCP. The control portion 4 need not invalidate control data according to SPP for the BT audio that does not require connection to SPP.

The control portion 4 may default to perform the connection processes in the order or HFP, SPP, AVRCP, and A2DP. The control portion 4 may permit an AVRCP connection request and preferentially perform the AVRCP connection process when receiving the AVRCP connection request from the mobile phone 3 as a communication partner. In this case, when completing the AVRCP connection process, the control portion 4 consequently receives an A2DP connection request from the specific-model mobile phone 3. The control portion 4 may permit the A2DP connection request to perform the A2DP connection process. According to this configuration, the control portion 4 can complete the AVRCP process and the A2DP connection process before or after completing the SPP connection process even if the specific-model mobile phone 3 is used as a communication partner.

The control portion 4 may default to perform the connection processes in the order or HFP, SPP, AVRCP, and A2DP. The control portion 4 may once reject an AVRCP connection request when receiving the AVRCP connection request from the mobile phone 3 as a communication partner. Triggered by the rejection of the AVRCP connection request, the control portion 4 may transmit the AVRCP connection request and preferentially perform the AVRCP connection process. Also in this case, the control portion 4 completes the AVRCP connection process to receive an A2DP connection request from the specific-model mobile phone 3. The control portion 4 may permit the A2DP connection request to perform the A2DP connection process. According to this configuration, the control portion 4 can relatively shorten the time period after completion of the HFP connection process until transmission of the AVRCP connection request as illustrated in FIG. 4 if the specific-model mobile phone 3 is used as a communication partner.

Further, the onboard apparatus 2 may transmit an A2DP connection request to the mobile phone 3 if no A2DP connection request is received from the mobile phone 3 after the lapse of a specified period on completion of the AVRCP connection process. No A2DP connection request may be received from the mobile phone 3 though a "replay" instruction is issued to the mobile phone 3. Also in this case, the onboard apparatus 2 may similarly transmit an A2DP connection request to the mobile phone 3. Consequently, the onboard apparatus 2 transmits an A2DP connection request to the mobile phone 3 to enable the A2DP connection.

The foregoing describes the case where the onboard apparatus 2 uses one communication partner and the BT communication is performed based on one-to-one correspondence between the onboard apparatus 2 and the communication partner apparatus as a source of audio data transfer. With reference to FIGS. 6 through 9, the following describes a case where the onboard apparatus 2 uses multiple communication partners and the BT communication is performed based on one-to-many correspondence between the onboard apparatus 2 and the communication partner apparatuses as a source of audio data transfer.

The onboard apparatus 2 can register multiple BT communication partners. The user can predetermine one onboard apparatus as a handsfree mobile phone and another as a music reproduction apparatus (portable apparatus) depending on purposes. Music reproduction on a portable apparatus signifies reproducing audio data stored in the nonvolatile storage portion of the communication partner apparatus. The following describes operations when the apparatus power supply is turned on under the condition that a mobile phone 3a is configured as a portable apparatus and a mobile phone 3b is configured as a data communication apparatus between a handsfree phone and the server 36.

As illustrated in FIG. 6, the control portion 4 in the onboard apparatus 2 outputs an HFP connection request to the BT module 5 (S301). The control portion 4 performs the HFP connection process that connects HFP between the BT module 5 and the BT module 25 of the mobile phone 3b (S21).

If the mobile phone 3b as a communication partner corresponds to the specific model, the control portion 4 transmits an AVRCP connection request to the onboard apparatus 2 after completion of the HFP connection process (S303). The control portion 4 determines that the BT module 5 receives an AVRCP connection request from the BT module 25 of the mobile phone 3b. The control portion 4 then determines whether the mobile phone 3b is configured as a portable apparatus. The present embodiment configures the communication partner (mobile phone 3a) different from the mobile phone 3b as a portable apparatus. According to the determination result, the control portion 4 rejects the AVRCP connection request from the mobile phone 3b. The control portion 4 permits the BT module 5 to transmit the AVRCP connection rejection to the BT module 25 of the mobile phone 3b (S304). If the mobile phone 3b is configured as a portable apparatus, the control portion 4 permits the AVRCP connection request from the mobile phone 3b without rejection and performs the AVRCP connection process.

The control portion 4 is notified of the HFP connection completion from the BT module 5 (S30) to determine the completion of the HFP connection process. The control portion 4 then outputs an AVRCP and A2DP connection request to the BT module 5 (S305). In this case, the mobile phone 3a is configured as a portable apparatus. The control portion 4 performs the AVRCP connection process that connects AVRCP between the BT module 5 and the BT module 25 of the mobile phone 3a (S22). The control portion 4 performs the A2DP connection process that connects A2DP between the BT module 5 and the BT module 25 of the mobile phone 3a (S23). The control portion 4 is notified of the AVRCP and A2DP connection completion from the BT module (S306). The control portion 4 communicates control data between the BT module 5 and the BT module 25 of the mobile phone 3a according to AVRCP. The control portion 4 transfers audio data from the BT module 25 of the mobile phone 3a to the BT module 5 according to A2DP and outputs the audio data from the speakers 18a and 18b.

The following describes operations when a user manipulation changes music reproduction on the portable apparatus to reproduction of audio data stored in the server 36 on the communication network 35 like the Internet radio, for example.

The control portion 4 determines that a manipulation was performed to change the source of audio data transfer from the mobile phone 3a to the server 36 on the communication network 35. The control portion 4 then outputs an AVRCP and A2DP disconnection request to the BT module 5 (S307). The control portion 4 performs an AVRCP disconnection process that disconnects AVRCP connected between the BT module 5 and the BT module 25 of the mobile phone 3a (S24). The control portion 4 performs an A2DP disconnection process that disconnects A2DP connected between the BT module 5 and the BT module 25 of the mobile phone 3a (S25).

After that, the control portion 4 may connect SPP to the mobile phone 3b to complete the AVRCP connection. If a specified time period has elapsed from the HFP connection completion, the specific-model mobile phone 3b does not transmit an A2DP connection request. The A2DP remains unconnected. An instruction to reproduce audio data stored in the server 36 on the communication network 35 outputs the audio data from the speaker 32 of the mobile phone 3*b* without the audio data being transferred according to A2DP.

The control portion 4 disconnects AVRCP and A2DP connected between the BT module 5 and the BT module 25 of the mobile phone 3*a*. As illustrated in FIG. 7, the control portion 4 then outputs an HFP disconnection request to the BT module 5 (S309). The control portion 4 performs an HFP disconnection process that disconnects HFP connected between the BT module 5 and the BT module 25 of the mobile phone 3*b* (S26).

The control portion 4 is notified of HFP disconnection completion from the BT module 5 (S310). The control portion 4 then outputs an HFP connection request to the BT module 5 (S311). The control portion 4 performs the HFP connection process that reconnects the disconnected HFP between the BT module 5 and the BT module 25 of the mobile phone 3*b* (S27).

The control portion 4 is notified of HFP connection completion from the BT module 5 (S312). The control portion 4 outputs an AVRCP and A2DP connection request to the BT module 5 (S313). The control portion 4 performs the AVRCP connection process that connects AVRCP between the BT module 5 and the BT module 25 of the mobile phone 3*b* (S28). The control portion 4 performs the A2DP connection process that connects A2DP between the BT module 5 and the BT module 25 of the mobile phone 3*b* (S29).

The control portion 4 is notified of the AVRCP and A2DP connection completion from the BT module 5 (S314). The control portion 4 outputs an SPP connection request to the BT module 5 (S315). The control portion 4 performs the SPP connection process that connects SPP between the BT module 5 and the BT module 25 of the mobile phone 3*b* (S30).

That is, the control portion 4 once disconnects the connected HFP, reconnects the disconnected HFP, connects AVRCP and A2DP, and connects SPP. This relatively shortens the time period (see T3 in FIG. 7) from completion of the HFP connection process to transmission of an AVRCP connection request. In this state, the control portion 4 can communicate control data between the BT module 5 and the BT module 25 of the mobile phone 3*b*. The control portion 4 can transfer audio data stored in the server 36 on the communication network 35 from the BT module 25 of the mobile phone 3*b* to the BT module 5 according to A2DP and output the audio data from the speakers 18*a* and 18*b*. The control portion 4 may once disconnect the connected HFP and then reconnect it only when the mobile phone 3*b* is identified as the specific model or when no A2DP connection request is received from the mobile phone 3*b* after the AVRCP connection completion.

The origin of audio data transfer may be changed while SPP as well as HFP is connected between the onboard apparatus 2 and the mobile phone 3*b*. In such a case, the control portion 4 once disconnects both HFP and SPP, reconnects HFP, connects AVRCP and A2DP, and reconnects SPP.

The foregoing describes the operations when a user manipulation changes music reproduction on the portable apparatus to reproduction of audio data stored in the server 36 on the communication network 35 like the Internet radio, for example. The same applies to a case where the portable apparatus is changed to the mobile phone 3*b* from the mobile phone 3*a* and the reproduction of audio data stored in the mobile phone 3*a* is changed to the reproduction of audio data stored in the mobile phone 3*b*. The control portion 4 performs the processes from S301 to S314 as illustrated in FIGS. 6 and 7. The control portion 4 thereby communicates control data between the BT module 5 and the BT module 25 of the mobile phone 3*b* according to AVRCP. The control portion 4 then transfers audio data stored in the mobile phone 3*a* from the BT module 25 of the mobile phone 3*b* to the BT module 5 according to A2DP and outputs the audio data from the speakers 18*a* and 18*b*.

The control portion 4 can independently (separately) perform the AVRCP connection process and the A2DP connection process. That is, the BT module 5 can transmit an A2DP connection request without awaiting an A2DP connection request from the BT module 25.

After performing S301 through S308 as illustrated in FIG. 6, the control portion 4 may output an SPP connection request to the BT module 5 (S401) as illustrated in FIG. 8. The control portion 4 may perform the SPP connection process that connects SPP between the BT module 5 and the BT module 25 of the mobile phone 3*b* (S41). The control portion 4 may be notified of the SPP connection completion from the BT module 5 (S402). The control portion 4 may output an A2DP connection request to the BT module 5 (S403). The control portion 4 may perform the A2DP connection process that connects A2DP between the BT module 5 and the BT module 25 of the mobile phone 3*b* (S42). In this case, the control portion 4 permits the BT module 5 to start the A2DP connection process when the BT module 5 transmits an A2DP connection request signal to the BT module 25 of the mobile phone 3*b*. This eliminates the process that once disconnects HFP and reconnects it.

The following describes operations after completion of the A2DP connection. Depending on specifications, the mobile phone 3 as a communication partner continues to close the audio data communication path and does not open it even after completion of the A2DP connection. In consideration of this, the control portion 4 performs processes illustrated in FIGS. 9 and 10.

After having completed the connection of SPP, A2DP, and AVRCP (S51 through S53), the control portion 4 may determine that the user uses the manipulation unit 22 to issue a request to start reproducing the Internet radio, for example. In this case, the control portion 4 outputs a communication path open request to the BT module 5 and starts operating a timer to clock the second setup time (T5).

The BT module 5 is supplied with the communication path open request from the control portion 4 and starts operating a timer to clock the first setup time (T4). If the first setup time has elapsed, the control portion 4 determines whether there is an open audio data communication path (to establish a communication channel) connected to the BT module 25 (S54). The first setup time or the second setup time may be configured according to specifications of the mobile phone 3 corresponding to multiple models. For example, the configuration may use the mobile phone 3 that autonomously opens the audio data communication path after completion of the connection to A2DP. For each of the models, the time is recorded from completion of the connection to A2DP until opening of the audio data communication path. The first setup time may be defined as the time (e.g., six seconds) longer than the largest value among the recorded times. The second setup time may be defined as the time (e.g., eight seconds) longer than the first setup time in consideration of the processing time to open the audio data communication path.

The BT module 5 determines that the audio data communication path is closed and is not opened (NO at S54). As illustrated in FIG. 9, the BT module 5 transmits a communication path open request to the BT module 25 of the mobile phone 3 and awaits a replay command from the control portion 4. The BT module 25 receives the communication path open request from the BT module 5 and opens the audio data communication path. On the other hand, the BT module 5 determines that the mobile phone 3 autonomously operates to open the closed audio data communication path and keep the audio data communication path open (YES at S54). As illustrated in FIG. 10, the BT module 5 awaits a replay command from the control portion 4 without transmitting the communication path open request to the BT module 25 of the mobile phone 3.

The control portion 4 detects that the second setup time has elapsed after the timer to clock the second setup time started. The control portion 4 then outputs the replay command to the BT module 5. The BT module 5 is supplied with the replay command from the control portion 4 and transmits the supplied replay command to the BT module 25. The BT module 25 receives the replay command from the BT module 5 and transmits a success command to the BT module 5 to indicate that the replay command is permitted. The BT module 25 buffers Internet radio audio data received from the server 36 on the communication network 35 (S55) and concurrently transmits the buffered audio data to the BT module 5. The BT module 5 receives the success command from the BT module 25 and outputs the received success command to the control portion 4. The BT module 5 receives the audio data from the BT module 25 and outputs the received audio data to the control portion 4. The control portion 4 permits the speakers 18a and 18b to output the audio data received from the mobile phone 3.

The mobile phone 3 as a communication partner may be specified to keep the audio data communication path closed and not to open it after completion the A2DP connection. The audio data communication path remains closed even if the onboard apparatus 2 thereafter transmits a replay command to the mobile phone 3. As illustrated in FIG. 11, the audio data is output from the speaker 32 of the mobile phone 3 and is not transferred from the mobile phone 3.

The present embodiment solves such a defect even if the mobile phone 3 as a communication partner may be specified to keep the audio data communication path closed without opening it after completion the A2DP connection. The onboard apparatus 2 transmits a communication path open request before transmitting the replay command to the mobile phone 3. This enables to open the audio data communication path when the onboard apparatus 2 thereafter transmits the replay command to the mobile phone 3. As a result, the mobile phone 3 transfers audio data and the audio data is output from the speakers 18a and 18b of the onboard apparatus 2. The foregoing describes the case of outputting Internet radio audio data received on the mobile phone 3 from the server 36 on the communication network 35. The same applies to a case of outputting audio data (music data registered to the mobile phone 3) stored in the nonvolatile storage portion 28 of the mobile phone 3.

According to the above-mentioned embodiment, the control portion 4 outputs a communication path open request to the BT module 5 and starts operating the timer to clock the second setup time. However, the control portion 4 may not start operating the timer to clock the second setup time. That is, the control portion 4 outputs the communication path open request to the BT module 5 and then determines whether the communication path is open. The control portion 4 may output the replay command to the BT module 5 if the communication path is determined to be open. In this case, the timing for the control portion 4 to output the replay command to the BT module 5 depends on a time period consumed to determine that the communication path is open.

According to the present embodiment, as described above, the onboard apparatus 2 transfers and outputs audio data stored in the mobile phone 3. In this case, the onboard apparatus 2 uses AVRCP to communicate control data and uses A2DP to transfer and output the audio data. On the other hand, the onboard apparatus 2 permits the mobile phone 3 to successively buffer, transfer, and output audio data stored in the server 36 on the communication network 35. In this case, the onboard apparatus 2 replaces AVRCP with SPP, uses SPP to communicate control data, and uses A2DP to transfer audio data. This enables to communicate any commands and data (payload) regardless of commands specified in AVRCP and transfer and output audio data using A2DP. Accordingly, various functions for the Internet radio are available.

A specified time period may be exceeded from completion of the HFP connection process to transmission of an AVRCP connection request. In such a case, the specific-model mobile phone 3 as a communication partner may not transfer audio data because A2DP remains unconnected even after completion of the AVRCP connection process. To solve this defect, the profiles are sequentially connected in the order of HFP, AVRCP, A2DP, and SPP. This can shorten the time period from completion of the HFP connection process to completion of the AVRCP connection process and the A2DP connection process. Even the specific-model mobile phone 3 is available as a communication partner.

Audio data stored in the mobile phone 3 may be transferred and output while HFP, AVRCP, A2DP, and SPP are connected to the mobile phone 3. In this case, control data according to SPP is invalidated while the SPP connection remains active. On the other hand, audio data stored in the server 36 on the communication network 35 may be transferred and output. In this case, control data according to AVRCP is invalidated while the AVRCP connection remains active. This enables to minimize a period that interrupts audio data output when the mode to output audio data is changed. The mode to output audio data can be changed seamlessly.

The music reproduction on the mobile phone 3a may be changed to the reproduction of Internet radio from the server 36 on the communication network 35 while HFP is connected to the mobile phone 3b and AVRCP and A2DP are connected to the mobile phone 3a. In this case, the present embodiment disconnects the connected AVRCP and A2DP from the mobile phone 3a. The present embodiment once disconnects the connected HFP from the mobile phone 3b, reconnects HFP to the mobile phone 3b, and connects AVRCP, A2DP, and SPP in order to the mobile phone 3b. This enables to appropriately change the music reproduction on the mobile phone 3a to the reproduction of Internet radio from the server 36 on the communication network 35.

The music reproduction on the mobile phone 3a may be changed to the music reproduction on the mobile phone 3b while HFP is connected to the mobile phone 3b and AVRCP and A2DP are connected to the mobile phone 3a. In this case, the present embodiment disconnects the connected AVRCP and A2DP from the mobile phone 3a. The present embodiment once disconnects the connected HFP from the mobile phone 3b, reconnects HFP to the mobile phone 3b, and connects AVRCP and A2DP to the mobile phone 3b. This enables to appropriately change the music reproduction on the mobile phone 3a to the music reproduction on the mobile phone 3b. If the HFP connection remains active, the music reproduction can be changed while enabling handsfree conversation if performed on the mobile phone 3b.

Depending on specifications, the mobile phone 3 as a communication partner may not open and keep the audio data communication path closed even after completion of the A2DP connection. To solve this defect, the present embodiment transmits a request to open the audio data communication path to the mobile phone 3 before transmitting the replay command to the mobile phone 3. This can prevent the defect that audio data cannot be transferred from the mobile phone 3 and is output from the speaker 32 of the mobile phone 3. Audio data can be transferred from the mobile phone 3 and can be output from the speakers 18a and 18b of the onboard apparatus.

The present disclosure is not limited to the above-mentioned embodiment but may be modified or enhanced as follows.

A short-range wireless communication apparatus is not limited to the onboard apparatus 2. The short-range wireless communication apparatus may include a BT module whose function corresponds to that of the BT module 5. The short-range wireless communication apparatus may be available as a navigation apparatus having known navigation functions or may not be mounted on vehicles. A communication partner apparatus as a data communication partner of the short-range wireless communication apparatus is not limited to the mobile phone 3. The communication partner apparatus may include a BT module whose function corresponds to that of the BT module 25. The communication partner apparatus may be available as a portable information terminal or as a stationary terminal users cannot carry.

A profile (specific communication protocol) that transfers control data by replacing AVRCP may be other than SPP.

While the aspect of the present disclosure described herein is already recited in "Summary of Invention", further optional aspects thereto are set out as follows.

For instance, as an optional aspect of the present disclosure, when determining that the first mode is selected in a state where the control portion keeps the audio data transfer protocol, the control data transfer protocol, and the specific data communication protocol connected to the communication partner apparatus, the control portion communicates the first control data with the communication partner apparatus according to the control data transfer protocol and permits the communication partner apparatus to transfer the first audio data according to the audio data transfer protocol. In contrast, when determining that the second mode is selected in the state where the control portion keeps the audio data transfer protocol, the control data transfer protocol, and the specific data communication protocol connected to the communication partner apparatus, the control portion communicates the second control data with the communication partner apparatus according to the specific data communication protocol and permits the communication partner apparatus to transfer the second audio data according to the audio data transfer protocol.

This does not need to disconnect or connect the control data transfer protocol or the specific data communication protocol when the first mode is changed to the second mode or when the second mode is changed to the first mode. This enables to minimize a period that interrupts audio data output. It is possible to seamlessly change the first mode to the second mode, or the second mode to the first mode.

Further, as an optional aspect of the present disclosure, when determining that the first mode is selected in a state where the control portion keeps the audio data transfer protocol, the control data transfer protocol, and the specific data communication protocol connected to the communication partner apparatus, the control portion invalidates the second control data according to the specific data communication protocol while keeping the specific data communication protocol connected, communicates the first control data with the communication partner apparatus according to the control data transfer protocol, and permits the communication partner apparatus to transfer the first audio data according to the audio data transfer protocol.

This permits changing the first mode to the second mode to just require validating second control data according to the invalidated specific data communication protocol because the specific data communication protocol is already connected. This enables to minimize a period that interrupts audio data output when the first mode changes to the second mode. The first mode can be seamlessly changed to the second mode.

Further, as an optional aspect of the present disclosure, when determining that the second mode is selected in a state where the control portion keeps the audio data transfer protocol, the control data transfer protocol, and the specific data communication protocol connected to the communication partner apparatus, the control portion invalidates the first control data according to the control data transfer protocol while keeping the control data transfer protocol connected, communicates the second control data with the communication partner apparatus according to the specific data communication protocol, and permits the communication partner apparatus to transfer the second audio data according to the audio data transfer protocol.

This permits changing the second mode to the first mode to just require validating first control data according to the invalidated control data transfer protocol because the control data transfer protocol is already connected. This enables to minimize a period that interrupts audio data output when the second mode changes to the first mode. The second mode can be seamlessly changed to the first mode.

Further, as an optional aspect of the present disclosure, the connection portion is also capable of connecting a handsfree communication protocol to specify handsfree communication with the communication partner apparatus. The control portion connects the handsfree communication protocol to the communication partner apparatus, then connects the specific data communication protocol to the communication partner apparatus, and then connects the control data transfer protocol and the audio data transfer protocol to the communication partner apparatus.

This enables to fast connect the specific data communication protocol after connecting the handsfree communication protocol and fast provide functions according to the specific data communication protocol.

Further, as an optional aspect of the present disclosure, the connection portion is also capable of connecting a handsfree communication protocol to specify handsfree communication with the communication partner apparatus. The control portion connects the handsfree communication protocol to the communication partner apparatus, then connects the control data transfer protocol and the audio data transfer protocol to the communication partner apparatus, and then connects the specific data communication protocol to the communication partner apparatus.

A specified time period may be exceeded from completion of a connection process according to the handsfree communication protocol to transmission of a connection request according to the control data transfer protocol. In such a case, some models of the communication partner apparatus, due to its specifications, may not transfer audio data according to the audio data transfer protocol even if the connection process according to the control data transfer protocol is complete. To solve this defect, the handsfree communication protocol may be connected, then the control data transfer protocol and the audio data transfer protocol may be connected. The specific data communication protocol may be connected later. This can prevent excess in the specified time period from completion of a connection process according to the handsfree communication protocol to transmission of a connection request according to the control data transfer protocol. This is also applicable to the communication partner apparatus according to the above-mentioned specifications.

Further, as an optional aspect of the present disclosure, the connection portion is also capable of connecting a handsfree communication protocol to specify handsfree communication with the communication partner apparatus. After the control portion connects the handsfree communication protocol to the communication partner apparatus, the control portion connects the control data transfer protocol and the audio data transfer protocol to the communication partner apparatus, and then connects the specific data communication protocol to the communication partner apparatus when the communication partner apparatus corresponds to a specific model. In contrast, after the control portion connects the handsfree communication protocol to the communication partner apparatus, the control portion connects the specific data communication protocol to the communication partner apparatus, and then connects the control data transfer protocol and the audio data transfer protocol to the communication partner apparatus when the communication partner apparatus does not correspond to a specific model.

Two options are available after connection of the handsfree communication protocol depending on whether the communication partner apparatus corresponds to the specific model. One option is to first connect the control data transfer protocol and the audio data transfer protocol and then connect the specific data communication protocol later. The other option is to first connect the specific data communication protocol and then connect the control data transfer protocol and the audio data transfer protocol later.

Further, as an optional aspect of the present disclosure, when receiving and rejecting a connection request for the control data transfer protocol from the communication partner apparatus after connecting the handsfree communication protocol to the communication partner apparatus, the control portion requests the communication partner apparatus to connect the control data transfer protocol to preferentially connect the control data transfer protocol.

Requesting the communication partner apparatus to connect the control data transfer protocol enables connection to the control data transfer protocol even if a connection request for the control data transfer protocol is received from the communication partner apparatus and is rejected.

Further, as an optional aspect of the present disclosure, when receiving a connection request, if any, for the control data transfer protocol from the communication partner apparatus after connecting the handsfree communication protocol to the communication partner apparatus, the control portion permits a connection request for the control data transfer protocol from the communication partner apparatus in order to preferentially connect the control data transfer protocol.

Permitting a connection request for the control data transfer protocol from the communication partner apparatus enables connection to the control data transfer protocol.

Further, as an optional aspect of the present disclosure, the connection portion is also capable of connecting a handsfree communication protocol to specify handsfree communication with the communication partner apparatus. After connecting the handsfree communication protocol and the specific data communication protocol to the communication partner apparatus, the control portion then connects the control data transfer protocol and the audio data transfer protocol to the communication partner apparatus when determining that the first mode is selected. After connecting the handsfree communication protocol and the specific data communication protocol to the communication partner apparatus, the control portion then connects the audio data transfer protocol to the communication partner apparatus when determining that the second mode is selected.

Two options are available after connecting the handsfree communication protocol and the specific data communication protocol depending on whether the first mode or the second mode is selected. One option is to connect the control data transfer protocol and the audio data transfer protocol. The other option is to connect the audio data transfer protocol.

Further, as an optional aspect of the present disclosure, the connection portion is also capable of connecting a handsfree communication protocol to specify handsfree communication with the communication partner apparatus. After connecting the handsfree communication protocol to the communication partner apparatus, the control portion then connects the control data transfer protocol and the audio data transfer protocol to the communication partner apparatus when determining that the first mode is selected. In contrast, after connecting the handsfree communication protocol to the communication partner apparatus, the control portion then connects the audio data transfer protocol and the specific data communication protocol to the communication partner apparatus when determining that the second mode is selected.

Two options are available after connecting the handsfree communication protocol depending on whether the first mode or the second mode is selected. One option is to connect the control data transfer protocol and the audio data transfer protocol. The other option is to connect the audio data transfer protocol and the specific data communication protocol.

Further, as an optional aspect of the present disclosure, a storage portion is included to be capable of storing a pre-power-off mode that indicates selection of either the first mode or the second mode before turning off the short-range wireless communication apparatus. When the short-range wireless communication apparatus is turned on, the control portion determines that the first mode is selected if the pre-power-off mode stored in the storage portion indicates the first mode, and determines that the second mode is selected if the pre-power-off mode stored in the storage portion indicates the second mode.

This enables the mode after turning on the short-range wireless communication apparatus to correspond to the mode before turning off the short-range wireless communication apparatus. The first mode is enabled after turning off the short-range wireless communication apparatus if the first mode is enabled before turning off the short-range wireless communication apparatus. First audio data can be transferred from the communication partner apparatus according to the audio data transfer protocol. The second mode is enabled after turning off the short-range wireless communication apparatus if the second mode is enabled before turning off the short-range wireless communication apparatus. Second audio data can be transferred from the communication partner apparatus according to the audio data transfer protocol.

Further, as an optional aspect of the present disclosure, a state takes place where the control portion connects the handsfree communication protocol to the communication partner apparatus and connects the control data transfer protocol and the audio data transfer protocol to an other communication partner apparatus. When determining, under the state that is taking place, to change an audio data transfer origin from the other communication partner apparatus to the communication partner apparatus, the control portion disconnects the control data transfer protocol and the audio data transfer protocol connected to the other communication partner apparatus while disconnecting the handsfree communication protocol connected to the communication partner apparatus, then reconnects the disconnected handsfree communication protocol to the communication partner apparatus, then connects the control data transfer protocol and the audio data transfer protocol to the communication partner apparatus, and then connects the specific data communication protocol to the communication partner apparatus.

One mode is assumed to permit another communication partner apparatus to transfer and output first audio data stored in a nonvolatile storage portion of the same communication partner apparatus. The other mode is assumed to permit the communication partner apparatus to transfer and output second audio data stored in a nonvolatile storage portion on the communication network. The former mode can be changed to the latter mode.

Further, as an optional aspect of the present disclosure, a state takes place where the control portion connects the handsfree communication protocol to the communication partner apparatus and connects the control data transfer protocol and the audio data transfer protocol to an other communication partner apparatus. When determining, under the state that is taking place, to change an audio data transfer origin from the other communication partner apparatus to the communication partner apparatus in the state, the control portion disconnects the control data transfer protocol and the audio data transfer protocol connected to the other communication partner apparatus, transmits a connection request for the audio data transfer protocol to the communication partner apparatus to connect the audio data transfer protocol to the communication partner apparatus, and further connects the specific data communication protocol to the communication partner apparatus.

One mode is assumed to permit another communication partner apparatus to transfer and output first audio data stored in a nonvolatile storage portion of the same communication partner apparatus. The other mode is assumed to permit the communication partner apparatus to transfer and output second audio data stored in a nonvolatile storage portion on the communication network. The former mode can be changed to the latter mode. In this case, the mode can be changed without disconnecting the handsfree communication protocol connected to the communication partner apparatus. The mode can be changed while enabling handsfree conversation if performed on the communication partner apparatus.

Further, as an optional aspect of the present disclosure, a state takes place where the control portion connects the handsfree communication protocol to the communication partner apparatus and connects the control data transfer protocol and the audio data transfer protocol to an other communication partner apparatus. When determining, under the state that is taking place, to change an audio data transfer origin from the other communication partner apparatus to the communication partner apparatus, the control portion disconnects the control data transfer protocol and the audio data transfer protocol connected to the other communication partner apparatus, disconnects the handsfree communication protocol connected to the communication partner apparatus, reconnects the disconnected handsfree communication protocol to the communication partner apparatus, and connects the control data transfer protocol and the audio data transfer protocol to the communication partner apparatus.

One mode is assumed to permit another communication partner apparatus to transfer and output first audio data stored in a nonvolatile storage portion of the same communication partner apparatus. The other mode is assumed to permit the communication partner apparatus to transfer and output first audio data stored in a nonvolatile storage portion of the communication partner apparatus. The former mode can be changed to the latter mode.

Further, as an optional aspect of the present disclosure, a state takes place where the control portion connects the handsfree communication protocol to the communication partner apparatus and connects the control data transfer protocol and the audio data transfer protocol to an other communication partner apparatus. When determining, under the state that is taking place, to change an audio data transfer origin from the other communication partner apparatus to the communication partner apparatus, the control portion disconnects the control data transfer protocol and the audio data transfer protocol connected to the other communication partner apparatus, connects the control data transfer protocol to the communication partner apparatus, and transmits a connection request for the audio data transfer protocol to the communication partner apparatus to connect the audio data transfer protocol to the communication partner apparatus.

One mode is assumed to permit another communication partner apparatus to transfer and output first audio data stored in a nonvolatile storage portion of the same communication partner apparatus. The other mode is assumed to permit the communication partner apparatus to transfer and output first audio data stored in a nonvolatile storage portion of the communication partner apparatus. The former mode can be changed to the latter mode. In this case, the mode can be changed without disconnecting the handsfree communication protocol connected to the communication partner apparatus. The mode can be changed while enabling handsfree conversation if performed on the communication partner apparatus.

Further, as an optional aspect of the present disclosure, a state takes place where the control portion connects the control data transfer protocol and the audio data transfer protocol to the communication partner apparatus. When determining, under the state that is taking place, issuance of a transfer request for the first audio data from the communication partner apparatus to the audio data transfer protocol, the control portion permits the connection portion to transmit an open request for an audio data communication path to the communication partner apparatus after a lapse of a first setup time from the issuance of the transfer request and permits the connection portion to transmit a replay command to the communication partner apparatus after a lapse of a second setup time, which is longer than the first setup time, from the issuance of the transfer request.

Depending on specifications, the communication partner apparatus may not open and keep the audio data communication path closed. In such a case, the communication partner apparatus cannot transfer first audio data even if a replay command is transmitted to the communication partner apparatus. This is because the communication partner apparatus does not open the communication path. As a result, the communication partner apparatus may output the first audio data. To solve this defect, a request to open the audio data communication path is transmitted to the communication partner apparatus before the replay command is transmitted to the communication partner apparatus. This enables to open the audio data communication path when the replay command is transmitted to the communication partner apparatus. As a result, the communication partner apparatus can transfer the first audio data. The first audio data transferred from the communication partner apparatus can be output.

Further, as an optional aspect of the present disclosure, a state takes place where the control portion connects the specific data communication protocol and the audio data transfer protocol to the communication partner apparatus. When determining, under the state that is taking place, issuance of a transfer request for the second audio data from the communication partner apparatus to the audio data transfer protocol in the state, the control portion permits the connection portion to transmit an open request for an audio data communication path to the communication partner apparatus after a lapse of a first setup time from the issuance of the transfer request and permits the connection portion to transmit a replay command to the communication partner apparatus after a lapse of a second setup time, which is longer than the first setup time, from the issuance of the transfer request.

Similarly, a request to open the audio data communication path may be transmitted to the communication partner apparatus before the replay command is transmitted to the communication partner apparatus. This enables to open the audio data communication path when the replay command is transmitted to the communication partner apparatus. As a result, the communication partner apparatus can transfer the second audio data. The second audio data transferred from the communication partner apparatus can be output.

While the present disclosure has been described with reference to embodiments thereof, it is to be understood that the present disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A short-range wireless communication apparatus comprising:
 a connection portion capable of connecting an audio data transfer protocol, a control data transfer protocol, and a specific data communication protocol to a communication partner apparatus via a short-range wireless link, wherein the audio data transfer protocol specifies transfer of audio data, the control data transfer protocol specifies transfer of control data concerning audio data control, and the specific data communication protocol specifies data communication;
 a control portion to select either a first mode or a second mode, wherein the first mode permits the communication partner apparatus to transfer first audio data stored in a nonvolatile storage portion of the communication partner apparatus and the second mode permits the communication partner apparatus to transfer second audio data stored in a nonvolatile storage portion of a server on a communication network; and
 an audio data output portion to output audio data transferred from the communication partner apparatus according to the audio data transfer protocol,
 wherein, when determining that the first mode is selected, in a state where the control portion keeps the control data transfer protocol and the audio data transfer protocol connected to the communication partner apparatus,
 the control portion
  communicates first control data concerning control of the first audio data with the communication partner apparatus according to the control data transfer protocol, and
  permits the communication partner apparatus to transfer the first audio data according to the audio data transfer protocol;
 wherein, when determining that the second mode is selected, in a state where the control portion keeps the audio data transfer protocol and the specific data communication protocol connected to the communication partner apparatus,
 the control portion
  communicates second control data concerning control of the second audio data with the communication partner apparatus according to the specific data communication protocol, and
  permits the communication partner apparatus to transfer the second audio data according to the audio data transfer protocol;
 wherein a state takes place where the control portion connects the control data transfer protocol and the audio data transfer protocol to an other communication partner apparatus; and
 wherein, when determining, under the state that is taking place, to change an audio data transfer origin from the other communication partner apparatus to the communication partner apparatus,
 the control portion
  disconnects the audio data transfer protocol connected to the other communication partner apparatus, and
  connects the specific data communication protocol and the audio data transfer protocol to the communication partner apparatus.

2. The short-range wireless communication apparatus according to claim 1,
 wherein, when determining that the first mode is selected in a state where the control portion keeps the audio data transfer protocol, the control data transfer protocol, and the specific data communication protocol connected to the communication partner apparatus, the control portion communicates the first control data with the communication partner apparatus according to the control data transfer protocol and permits the communication partner apparatus to transfer the first audio data according to the audio data transfer protocol; and
 wherein, when determining that the second mode is selected in the state where the control portion keeps the audio data transfer protocol, the control data transfer protocol, and the specific data communication protocol connected to the communication partner apparatus, the control portion communicates the second control data with the communication partner apparatus according to the specific data communication protocol and permits the communication partner apparatus to transfer the second audio data according to the audio data transfer protocol.

3. The short-range wireless communication apparatus according to claim 1, wherein,
 when determining that the first mode is selected in a state where the control portion keeps the audio data transfer protocol, the control data transfer protocol, and the specific data communication protocol connected to the communication partner apparatus,
 the control portion
  invalidates the second control data according to the specific data communication protocol while keeping the specific data communication protocol connected,
  communicates the first control data with the communication partner apparatus according to the control data transfer protocol, and
  permits the communication partner apparatus to transfer the first audio data according to the audio data transfer protocol.

4. The short-range wireless communication apparatus according to claim 1, wherein, when determining that the second mode is selected in a state where the control portion keeps the audio data transfer protocol, the control data transfer protocol, and the specific data communication protocol connected to the communication partner apparatus, the control portion invalidates the first control data according to the control data transfer protocol while keeping the control data transfer protocol connected, communicates the second control data with the communication partner apparatus according to the specific data communication protocol, and permits the communication partner apparatus to transfer the second audio data according to the audio data transfer protocol.

5. The short-range wireless communication apparatus according to claim 1, wherein the connection portion is also capable of connecting a handsfree communication protocol to specify handsfree communication with the communication partner apparatus; and wherein the control portion connects the handsfree communication protocol to the communication partner apparatus, then connects the specific data communication protocol to the communication partner apparatus, and then connects the control data transfer protocol and the audio data transfer protocol to the communication partner apparatus.

6. The short-range wireless communication apparatus according to claim 5, wherein when receiving and rejecting a connection request for the control data transfer protocol from the communication partner apparatus after connecting the handsfree communication protocol to the communication partner apparatus, the control portion requests the communication partner apparatus to connect the control data transfer protocol to preferentially connect the control data transfer protocol.

7. The short-range wireless communication apparatus according to claim 5, wherein when receiving a connection request, if any, for the control data transfer protocol from the communication partner apparatus after connecting the handsfree communication protocol to the communication partner apparatus, the control portion permits a connection request for the control data transfer protocol from the communication partner apparatus in order to preferentially connect the control data transfer protocol.

8. The short-range wireless communication apparatus according to claim 1, wherein the connection portion is also capable of connecting a handsfree communication protocol to specify handsfree communication with the communication partner apparatus; and wherein the control portion connects the handsfree communication protocol to the communication partner apparatus, then connects the control data transfer protocol and the audio data transfer protocol to the communication partner apparatus, and then connects the specific data communication protocol to the communication partner apparatus.

9. The short-range wireless communication apparatus according to claim 1, wherein the connection portion is also capable of connecting a handsfree communication protocol to specify handsfree communication with the communication partner apparatus;

wherein after the control portion connects the handsfree communication protocol to the communication partner apparatus, the control portion connects the control data transfer protocol and the audio data transfer protocol to the communication partner apparatus, and then connects the specific data communication protocol to the communication partner apparatus when the communication partner apparatus corresponds to a specific model; and wherein after the control portion connects the handsfree communication protocol to the communication partner apparatus, the control portion connects the specific data communication protocol to the communication partner apparatus, and then connects the control data transfer protocol and the audio data transfer protocol to the communication partner apparatus when the communication partner apparatus does not correspond to a specific model.

10. The short-range wireless communication apparatus according to claim 1, wherein the connection portion is also capable of connecting a handsfree communication protocol to specify handsfree communication with the communication partner apparatus;

wherein after connecting the handsfree communication protocol and the specific data communication protocol to the communication partner apparatus, the control portion then connects the control data transfer protocol and the audio data transfer protocol to the communication partner apparatus when determining that the first mode is selected; and wherein after connecting the handsfree communication protocol and the specific data communication protocol to the communication partner apparatus, the control portion then connects the audio data transfer protocol to the communication partner apparatus when determining that the second mode is selected.

11. The short-range wireless communication apparatus according to claim 1, wherein the connection portion is also capable of connecting a handsfree communication protocol to specify handsfree communication with the communication partner apparatus;

wherein after connecting the handsfree communication protocol to the communication partner apparatus, the control portion then connects the control data transfer protocol and the audio data transfer protocol to the communication partner apparatus when determining that the first mode is selected; and wherein after connecting the handsfree communication protocol to the communication partner apparatus, the control portion then connects the audio data transfer protocol and the specific data communication protocol to the communication partner apparatus when determining that the second mode is selected.

12. The short-range wireless communication apparatus according to claim 1, comprising:

a storage portion capable of storing a pre-power-off mode that indicates selection of either the first mode or the second mode before turning off the short-range wireless communication apparatus, wherein, when the short-range wireless communication apparatus is turned on, the control portion determines that the first mode is selected if the pre-power-off mode stored in the storage portion indicates the first mode, and determines that the second mode is selected if the pre-power-off mode stored in the storage portion indicates the second mode.

13. The short-range wireless communication apparatus according claim 1,
wherein a state takes place where the control portion connects the control data transfer protocol and the audio data transfer protocol to the communication partner apparatus; and
wherein, when determining, under the state that is taking place, issuance of a transfer request for the first audio data from the communication partner apparatus to the audio data transfer protocol, the control portion
permits the connection portion to transmit an open request for an audio data communication path to the communication partner apparatus after a lapse of a first setup time from the issuance of the transfer request and
permits the connection portion to transmit a replay command to the communication partner apparatus after a lapse of a second setup time, which is longer than the first setup time, from the issuance of the transfer request.

14. The short-range wireless communication apparatus according claim 1,
wherein a state takes place where the control portion connects the specific data communication protocol and the audio data transfer protocol to the communication partner apparatus; and
wherein, when determining, under the state that is taking place, issuance of a transfer request for the second audio data from the communication partner apparatus to the audio data transfer protocol, the control portion
permits the connection portion to transmit an open request for an audio data communication path to the communication partner apparatus after a lapse of a first setup time from the issuance of the transfer request and
permits the connection portion to transmit a replay command to the communication partner apparatus after a lapse of a second setup time, which is longer than the first setup time, from the issuance of the transfer request.

15. The short-range wireless communication apparatus according to claim 1,
wherein the short-range wireless link corresponds to a Bluetooth link; and
wherein the connection portion is capable of connecting the audio data transfer protocol, the control data transfer protocol, and the specific data communication protocol to the communication partner apparatus through the Bluetooth link.

16. The short-range wireless communication apparatus according claim 15,
wherein the audio data transfer protocol corresponds to A2DP (Advanced Audio Distribution Profile);
wherein the control data transfer protocol corresponds to AVRCP (Audio/Video Remote Control Profile);
wherein the specific data communication protocol corresponds to SPP (Serial Port Profile); and
wherein the connection portion is capable of connecting the A2DP, the AVRCP, and the SPP to the communication partner apparatus through the Bluetooth link.

17. The short-range wireless communication apparatus according to claim 1, wherein the control portion permits the communication partner apparatus to transfer audio data for Internet radio as the second audio data.

* * * * *